(12) United States Patent
VanNeste et al.

(10) Patent No.: US 11,668,807 B2
(45) Date of Patent: Jun. 6, 2023

(54) OMNIDIRECTIONAL, ELECTRIC NEAR-FIELD DISTANCE SENSING DEVICE

(71) Applicant: Tennessee Technological University, Cookeville, TN (US)

(72) Inventors: Charles W. VanNeste, Cookeville, TN (US); Charles A. Robinson, Cookeville, TN (US); Brandon J. Childress, Cookeville, TN (US)

(73) Assignee: Tennessee Technological University, Cookeville, TN (US)

( * ) Notice: Subject to any disclaimer, the term of this patent is extended or adjusted under 35 U.S.C. 154(b) by 0 days.

(21) Appl. No.: 17/806,423

(22) Filed: Jun. 10, 2022

(65) Prior Publication Data

US 2022/0299618 A1 Sep. 22, 2022

Related U.S. Application Data

(63) Continuation of application No. 16/839,015, filed on Apr. 2, 2020, now Pat. No. 11,360,200.

(60) Provisional application No. 62/828,162, filed on Apr. 2, 2019.

(51) Int. Cl.
*H02J 50/12* (2016.01)
*H02J 50/40* (2016.01)
*H04B 5/00* (2006.01)
*G01R 27/26* (2006.01)
*G01S 11/06* (2006.01)
*G01S 5/14* (2006.01)

(52) U.S. Cl.
CPC ............ *G01S 11/06* (2013.01); *G01S 5/14* (2013.01); *H04B 5/0075* (2013.01)

(58) Field of Classification Search
None
See application file for complete search history.

(56) References Cited

U.S. PATENT DOCUMENTS 6,867,634 B2 * 3/2005 Aiello ................ H02M 1/4225
327/563
7,007,554 B2 * 3/2006 Omata ................ G01D 5/2013
73/800

(Continued)

FOREIGN PATENT DOCUMENTS

EP 3096436 * 11/2016 ............ H02J 50/00
EP 3096436 A1 11/2016

*Primary Examiner* — Tuan A Tran
(74) *Attorney, Agent, or Firm* — André J. Bahou; Christopher T. McNeill; Holland & Knight LLP

(57) ABSTRACT

A sensor system is disclosed for sensing the position of an object. The system can include a power source and a nullification circuit electrically connected to the power source, the nullification circuit including an output voltage. An electrical medium can be integrated into the nullification circuit, the electrical medium producing a standing wave electric field about the electrical medium when power is supplied from the power source to the electrical medium. The nullification circuit is configured such that the output voltage of the nullification circuit is substantially zero when power is supplied to the electrical medium and the object is not within a predetermined minimum distance from the electrical medium, the output voltage of the nullification circuit having a non-zero value when the object is within the predetermined minimum distance from the electrical medium.

19 Claims, 17 Drawing Sheets

(56) References Cited

U.S. PATENT DOCUMENTS

| | | | | |
|---|---|---|---|---|
| 8,159,234 B2* | 4/2012 | Niwa | ............... | H03K 17/9502 |
| | | | | 324/207.16 |
| 8,432,169 B2* | 4/2013 | Niwa | ............... | H03K 17/9502 |
| | | | | 324/686 |
| 9,197,271 B2* | 11/2015 | Peter | ................... | H04W 64/00 |
| 9,214,937 B2* | 12/2015 | Thoss | ............... | H03K 17/9525 |
| 9,739,740 B2* | 8/2017 | Wherritt | ............ | G01N 33/2829 |
| 9,769,769 B2* | 9/2017 | Harper | ................ | H04B 7/022 |
| 9,831,686 B2* | 11/2017 | Kohara | ................ | H02J 50/90 |
| 9,948,130 B2* | 4/2018 | Aikawa | ................ | H02J 7/025 |
| 10,566,971 B2* | 2/2020 | Selvaraj | ............. | G06F 13/4072 |
| 10,673,285 B2* | 6/2020 | Ha | ........................ | H02J 50/60 |
| 10,707,868 B2* | 7/2020 | Koizumi | ............... | G01D 5/204 |
| 11,175,428 B2* | 11/2021 | Oshima | ................. | H02J 50/12 |
| 2019/0074832 A1* | 3/2019 | Selvaraj | ............. | G06F 13/4072 |
| 2019/0257974 A1* | 8/2019 | Okamoto | ........... | H03K 17/9502 |

* cited by examiner

OMNIDIRECTIONAL, ELECTRIC NEAR-FIELD DISTANCE SENSING DEVICE

CROSS-REFERENCES TO RELATED APPLICATIONS

This non-provisional patent application claims priority to U.S. patent application Ser. No. 16/839,015, entitled "Omnidirectional, Electric Near-Field Distance Sensing Device," filed Apr. 2, 2020, which issued as U.S. Pat. No. 11,360,200 on Jun. 14, 2022; which claims priority to U.S. Provisional Patent Application No. 62/828,162, filed Apr. 2, 2019, entitled "OMNIDIRECTIONAL, ELECTRIC NEAR-FIELD DISTANCE SENSING DEVICE." The entirety of these applications are incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to novel systems and methods for object-sensing or determining an object's change in position, velocity, or speed.

Conventional methods of object-sensing use multiple devices to accurately locate objects in relation to each other, but many sensing devices are not omnidirectional, or they require numerous sensing components which can be costly and consume large amounts of energy, which is undesirable. In some conventional systems, electromagnetic fields can be detected by numerous coils spread around a designated area. These coils are used for creating a coordinate grid for one or more field-transmitting devices by changing the polarity of the electromagnetic field. The transmitting devices emit electromagnetic fields that are monitored through the surrounding coils with attached processing devices. The receiving devices map locations and movement of the transmitter (s) from change within the electromagnetic field.

Many conventional systems for object-sensing in the prior art use transmitting and receiving displacements of electromagnetic field-producing devices to sense objects. Prior art systems involved several complex electrical components and consume large amounts of electricity to power their object-sensing components.

While object sensing is important in many fields, including but limited to robotics systems, systems for analyzing dielectric material characteristics, lighting systems, and occupancy sensing systems, object sensing can be of particular importance for vehicles in the Wireless Power Transfer (WPT) commercial domain. Approaching Electric Vehicle (EV) alignment, velocity, and position are critical parameters for the efficient transfer of power. Beyond energy transfer, there are several factors that arise as technology advances. Bystander safety is one factor that continues to increase as charging power levels in such systems move into a Level 3 domain. The ability to distinguish human from vehicle is also important in such applications. For high energy Induction Power Transfer (IPT) systems, small metal objects that accidently fall between the transmitter and receiver during charging will become rapidly heated to extreme temperatures due to induced eddy currents on the object's surface. Such an effect can turn a simple set of keys, ring, coin, or soft drink container into a severe burn/fire hazard.

Presently, the instrumentation used for detection in WPT requires multiple types of sensors in a complex network. The forms of sensing devices that have been employed include optical (Infrared/LIDAR), acoustic, and magnetic. Each of these sensor sensors. These types of sensors pose certain challenges. Infrared detection is only suitable for bulk positioning and requires multiple elements to obtain an omnidirectional detection. For higher resolution, LIDAR could be used but such devices are expensive and demand high processing requirements. The most popular sensor found in literature for WPT is a magnetic device. These magnetic sensors generally take the form of an inductor that is either a separate "sensing coil" next to/integrated with the power transmitter and driven in a low power state. Such sensing coils are often used to detect an approaching receiver (Rx) or an interfering metal object. They are unable to detect other objects, such as bystanders, and normally have a very limited detection range.

What is needed then are improved systems and methods for object-sensing and determining an object's position, velocity, speed, or changes thereof.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a sensor system for sensing the position of an object. The system can include a power source and a nullification circuit electrically connected to the power source, the nullification circuit including an output voltage. An electrical medium can be integrated into the nullification circuit, the electrical medium producing a standing wave electric field about the electrical medium when power is supplied from the power source to the electrical medium. The nullification circuit is configured such that the output voltage of the nullification circuit is substantially zero when power is supplied to the electrical medium and the object is not within a predetermined minimum distance from the electrical medium, the output voltage of the nullification circuit having a non-zero value when the object is within the predetermined minimum distance from the electrical medium.

Another aspect of the present disclosure is a sensor system for sensing the position of a vehicle relative to an object. The system can include a power source and a nullification circuit electrically connected to the power source, the nullification circuit including an output voltage. An electrical medium can be integrated into the nullification circuit, the electrical medium producing a standing wave electric field about the electrical medium when power is supplied from the power source to the electrical medium. The sensing system can be mountable to the vehicle and the nullification circuit can be configured such that the output voltage of the nullification circuit is substantially zero when the sensing system is mounted to the vehicle, power is supplied to the electrical medium and the object is not within a predetermined minimum distance from the electrical medium, the output voltage of the nullification circuit having a non-zero value when the object is within the predetermined minimum distance from the electrical medium.

Another aspect of the present disclosure is a method of sensing the position of an object, the method comprising the steps of providing: a power source; a nullification circuit electrically connected to the power source, the nullification circuit including an output voltage; and an electrical medium integrated into the nullification circuit, the electrical medium producing a standing wave electric field about the electrical medium when power is supplied from the power source to the electrical medium. The method further includes the steps of balancing the nullification circuit such that the output voltage is substantially zero when power is supplied to the electrical medium and the object is not within a predetermined minimum distance from the electrical medium, and detecting a non-zero value of the output voltage when the object is within the predetermined minimum distance from the electrical medium. The detected non-zero output voltage can be utilized to determine a distance of the object from the electrical medium or a position of the object relative to the electrical medium.

The systems and methods of the present disclosure may be utilized to measure the potential voltage difference in a nullification circuit that occurs when an object moves in an area surrounding one or more electrical mediums in order to determine a distance of the object from the one or more electrical mediums, as well as a location, velocity, or speed of the object in some embodiments. The systems and methods disclosed herein may utilize standing wave propagation within an electric near-field to detect an object's electric or dielectric characteristics as it approaches an electrical medium. An electrical standing wave may use a maximum or minimum potential gradient to deliver power from the electrical medium and the load efficiently. The systems and methods of the disclosure may generally provide inexpensive omnidirectional sensing using near-field mechanics. The systems and methods of the disclosure may be applicable to the fields of robotics, manufacturing, and wireless power systems, in addition to other fields.

Numerous other objects, advantages and features of the present disclosure will be readily apparent to those of skill in the art upon a review of the following drawings and description of a preferred embodiment.

DETAILED DESCRIPTION

Figure 1:
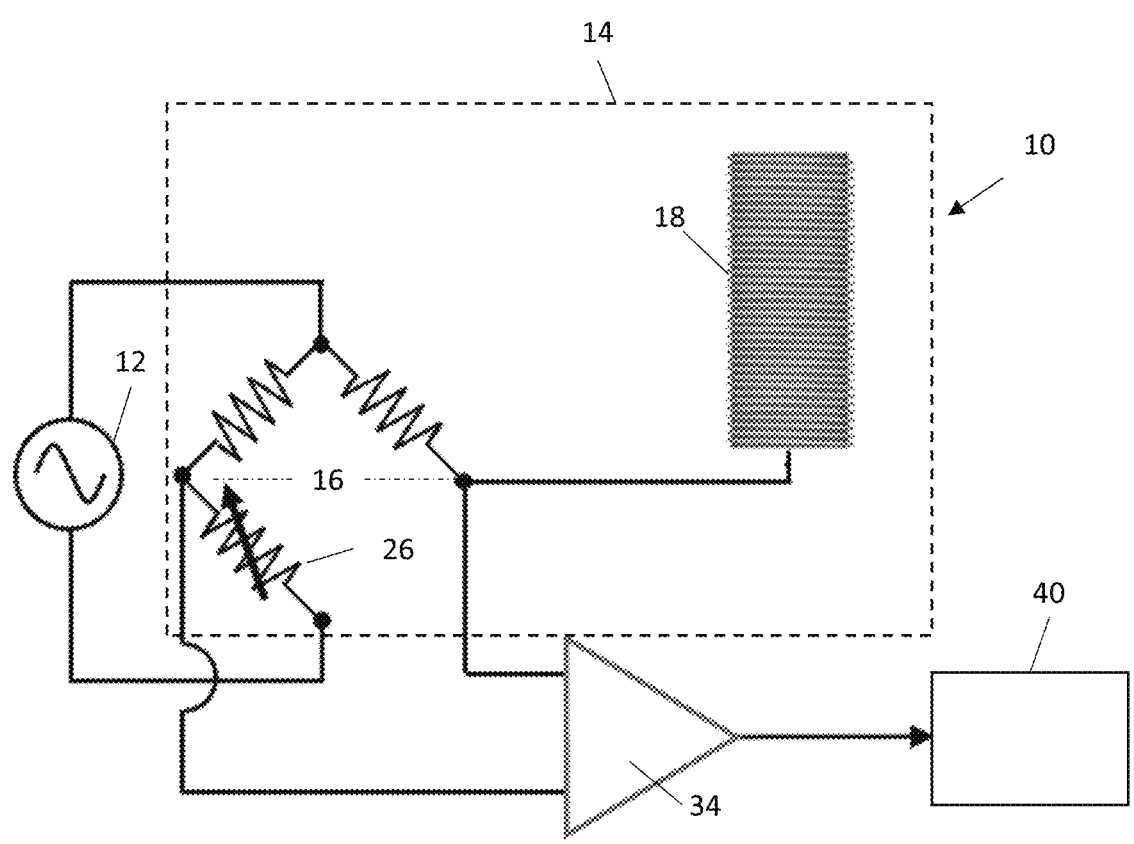
FIG. 1 is a circuit diagram of an exemplary sensing system of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific system and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the system or components thereof when in the orientation shown in the drawing. A person of skill in the art will recognize that the system can assume different orientations when in use.

Figure 2:
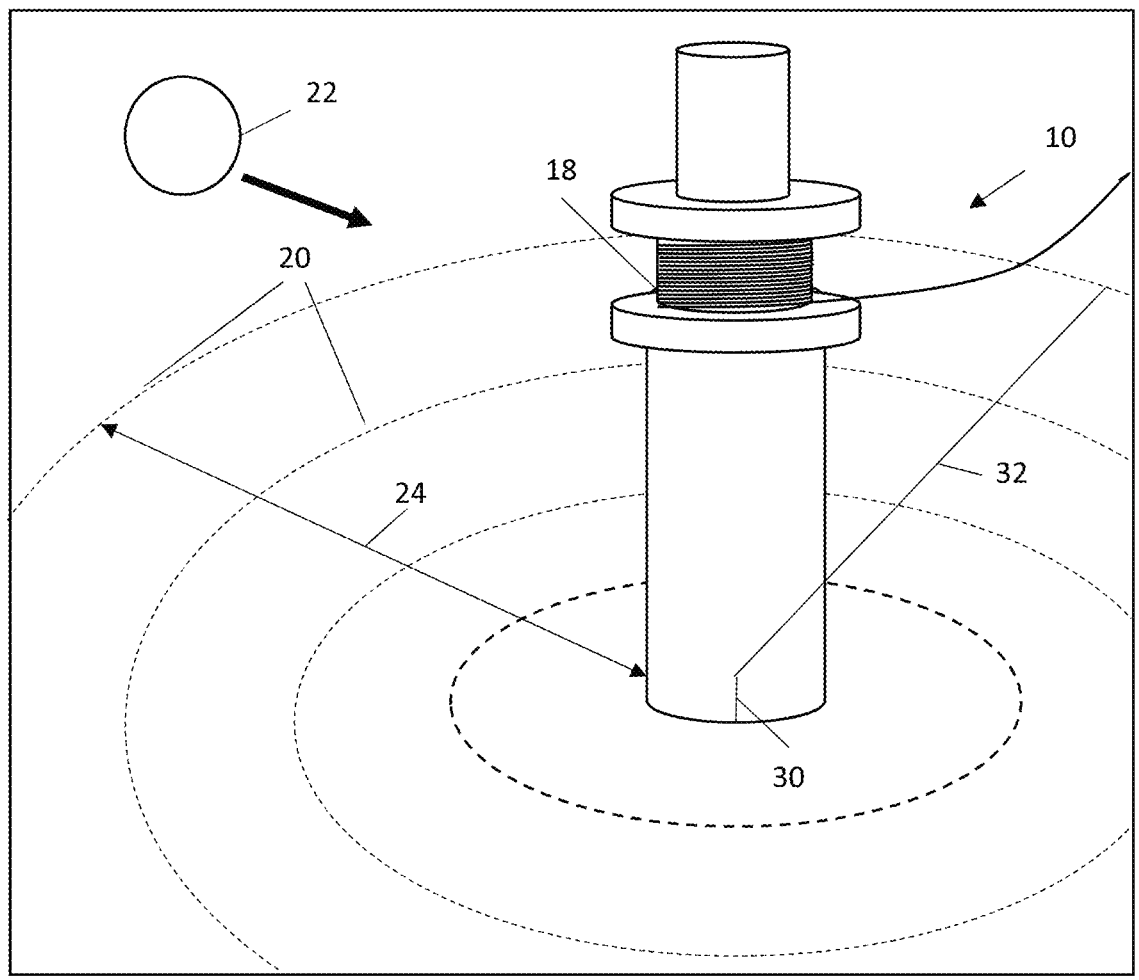
FIG. 2 is a perspective view of an exemplary embodiment of an electrical medium utilized in the sensing system of FIG. 1.

One aspect of the disclosure is a sensor system 10 for sensing the position of an object 22. One embodiment of a sensing system 10 of the present disclosure is shown in FIGS. 1-2. The system 10 can include a power source 12 and a nullification circuit 14 electrically connected to the power source, the nullification circuit 14 including an output voltage 16. The output voltage 16 can be described as the differential voltage between opposite sides or lines of the nullification circuit 14. An electrical medium 18 can be integrated into the nullification circuit 14, the electrical medium 18 producing a standing wave electric field 20 about the electrical medium 18 when power is supplied from the power source 12 to the electrical medium 18. The nullification circuit 14 can be configured such that the output voltage 16 of the nullification circuit 14 is substantially zero when power is supplied to the electrical medium 18 and the object 22 is not within a predetermined minimum distance 24 from the electrical medium 18, the output voltage 16 of the nullification circuit 14 having a non-zero value when the object 22 is within the predetermined minimum distance 24 from the electrical medium 18.

A substantially non-zero output voltage 16 can be defined as a differential voltage of less than or equal to 0.1 V, or, depending on the sensitivity of the system 10, a voltage below another suitable upper threshold voltage above which indicates a significant interference in the electrical field 20 produced by the electrical medium 18. The predetermined minimum distance 24 can be defined as the distance at which an object 22 begins to significantly interfere with the electrical field 20 produced by the electrical medium 18 or induces a non-zero output voltage in the nullification circuit 14.

In one embodiment of this invention, an alternating power source 12 can produce a standing wave to a conductive electrical medium 18 such as a wire coil. An electrical medium 18 is defined as any state of matter that allows for propagations of any magnitude of electrical energy. The medium 18 and source 12 can be fed through the nullification circuit 14, which in some embodiments can include a Wheatstone bridge circuit, for determining the voltage potential difference or output voltage 16 of the nullification circuit 14 as objects approach the medium's 18 omnidirectional standing wave electric field 20. The output voltage 16 can be observed by tuning in the electrical medium 18 to its natural resonant frequency. The resonant frequency is dependent on the surroundings and physical properties of the electrical medium 18. Equation 1, below, is a unique formula for determining the standing wave resonant frequency for the used electrical medium 18 to achieve maximum projection of the electric near-field:

$$\omega_0^2 = \frac{1}{LC}\frac{[\cosh(X)-\sinh(X)]}{[\cosh(X)+\sinh(X)]} = \frac{1}{LCe^{2X}} \quad \text{(Equation 1)}$$

In Equation 1, $\omega_0$ is the standing wave resonant frequency or electrical medium 18, L is the sum of inductance of the surroundings and device, C is the sum of the capacitance of the surroundings and device, and X is a position along the electrical medium 18. Addition of multiple sensing devices to the same circuit adds a new differential voltage to be measured using direct current and voltage measuring techniques.

In one embodiment, as shown in FIG. 1, an alternating power source 12 is connected to a Wheatstone bridge circuit 14. In some embodiments, the sensing system can include a reference point. The reference point may be any state of matter allowing the propagation of electrical energy and serving as individual electrical reference points. Examples of reference point may include, but are not limited to, the earth, circuit common ground, or another reference point. This connection between the sensing system and the reference point may be capacitively coupled or may be a direct connection with any amount of inductance. The electrical medium 18 may be connected to the Wheatstone bridge circuit 14, and this connection may be capacitively coupled or may be a direct connection with any amount of inductance. The Wheatstone bridge circuit 14 may be one or more variations placed in standard electrical arrangements known to those skilled in the art. Examples of suitable electrical medium 18 may include a wire, a conductive material, a coiled wire (inductor), or another electrical body suitable for propagating a standard wave electrical field.

In some embodiments, an additional electrical medium can be connected through the Wheatstone bridge circuit 14 and this connection may be capacitively coupled or a direct connection with any amount of inductance. A digital converter circuit can be connected between the Wheatstone bridge circuit 14 and each of the electrical mediums 18, and this connection may be capacitively coupled or a direct connection with any amount of inductance.

In some embodiments, the nullification circuit 14 can include an adjustable resistor 26 that is operable to set the initial output voltage 16 of the nullification circuit 14 to zero when the object is not within the predetermined minimum distance from the electrical medium 18. Depending on the environment in which the sensing system 10 is used, the associated resistance in the electrical medium 18 may differ, and having an adjustable resistance device 26 can allow the nullification circuit 14 to be balanced to set an initial output voltage 16 of the nullification circuit to substantially zero when an object is not within the predetermined minimum distance from the electrical medium 18. In other embodiments, the nullification circuit 14 can include any suitable voltage balancer, including adjustable resistors, capacitors, inductors, diodes, etc. which can help balance the nullification circuit 14 and set the output voltage 16 to substantially zero when no object is present.

In one application of the sensing system 10 of the present disclosure, the ability to know a wirelessly equipped electric vehicle's rate of approach and alignment with respect to the power transmitter in a wireless power transfer system is critical for efficient wireless power transfer. Electricity costs can be reduced if transmitters can remain off until a receiver is brought within the proper coupling range. Likewise, knowledge of alignment can aid in adjusting the transmitter's field (if adjustable) or navigating the vehicle to a better position. The sensing system 10 of the present disclosure can help provide a low cost, low power, simplistic, and highly robust sensing system for such an application. In one embodiment, the electrical medium 18 can be a quarter waver resonator, and the sensing system 10 can utilize the stray capacitance changes between a quarter wave resonator 18 and external objects to detect the distance between the quarter wave resonator 18 and the objects. When two electrical mediums 18 are used in tandem, the distance, position, and velocity of an oncoming object can be determined. In some embodiments, based on the particular dimensions of the quarter wave resonator, object can be detected and the predetermined minimum distance can be within a 1 meter radius of the quarter wave resonators 18 utilized.

Beyond energy transfer, there are several factors that arise as the technology advances. Bystander safety is one factor that continues to increase as charging power levels move into a Level 3 domain. The ability to distinguish human from vehicle is important in such cases. For high energy induction power transfer systems, small metal objects that accidently fall between the transmitter and receiver during charging will become rapidly heated to extreme temperatures due to induced eddy currents on the object's surface. Such an effect can turn a simple set of keys, ring, coin, or soft drink container into a severe burn/fire hazard.

Quarter wave resonators functioning as receivers have been shown to improve power transfer capacity/efficiency and reduce electrode voltages in unipolar capacitive wireless power transfer systems. One of the challenges they pose when applied to WPT is the "detuning" effect that occurs when nearby objects come in close proximity. The object causes an alteration of the stray capacitance value and if the power source is not frequency adaptive, or other steps are taken, power transfer to the load ceases.

In the sensing system 10 of the present disclosure, this detuning effect will be used as an advantage. By integrating the quarter wave resonator or other suitable electronic medium 18 into a nullification circuit 14 such as a simple Wheatstone bridge circuit, where the quarter wave resonator 18 forms one branch of the Wheatstone bridge circuit 14, it becomes possible to observe extremely minute field changes from distances exceeding 1.4 m using a quarter wave resonator approximately 10 cm tall. It has been observed through experimentation that the "near-field" or electric field of a quarter wave resonator 18 has a fixed boundary or predetermined minimum distance that is dependent on the geometry of the resonator 18 and independent on the drive voltage. Increasing drive voltage only improves the signal to noise ratio but does not extend the sensing distance or predetermined minimum distance of the resonator 18. Due to this, the drive voltage can be low without minimal change in the sensor performance with larger resonator structures capable of larger distances of detection.

In some embodiments, helically coiled quarter wave resonators can be utilized for the electrical medium. In other embodiments, any suitable coil geometry can be utilized for the resonators 18. It has been observed that an object's interference with a standard wave electric field propagated by an electric medium 18 is dependent on the distance between the object and the electrical medium. The closer the object is to the electrical medium 18, the greater the influence on the electric field propagated by the electrical medium 18. This relationship can be utilized to detect the distance between an object and an electrical medium utilizing the sensing system 10 of the present disclosure. Two electric mediums 18, and in some embodiments, two quarter wave resonators 18, can be operated in tandem to offer two degrees of positional sensing that can be used to determine both speed and direction.

It has been shown that the electrical distribution (voltage, current, inductance, capacitance) of a quarter wave resonator 18 can be modeled as a transmission line where each sectional inductance is mutually coupled to inductors in adjacent sections. The generalized resonant expression was derived as Equation 2, below $$\omega_0^2 = \frac{1}{LC} \left[ \frac{1}{\sum_i x_i^2} \right] \left[ 1 + \sum_i \left( \frac{x_i + x_{i+1}}{x_i} \right) \right] \quad \text{(Equation 2)}$$

In Equation 2, $x_i$ is the line length contribution of inductance through multiple discrete sections in the transmission line model. These are derived from a per unit length inductance that is coupled to multiple sections ahead and behind itself. The lumped inductive elements in this transmission line model can therefore no longer be assigned a per-unit length, but a grouping of per unit lengths ($x_i$). As current progresses down the line, the additive contribution of inductance will alter the inductive coupling and change the number of sections that contribute. The case is the same for the length contribution of capacitance ($x_i'$) which cannot be assumed to have the same distribution $x_i$. Solving $x_i'$ yields a capacitive reactance (Xc) that is dependent on a non-linear distance, as shown in Equation 3, below:

$$X_C = \frac{1}{\omega_0 C e^\phi} \quad \text{(Equation 3)}$$

In Equation 3, $\omega_0$ is the angular frequency, C is the capacitance (for a quarter wave resonator 18 it should be noted that this is a stray or parasitic capacitance), and $\Phi$ is the position along the quarter wave resonator measured in radians. It should be noted that this model is only applicable when the system is at resonance. Experimental investigations have shown that this model is reasonably accurate when comparing the theory to experimental measurements.

It follows from Equation 3 that the capacitance is distributed exponentially along the quarter wave resonator. In order to determine a "range of influence" where changes in stray capacitance (C) will detune the system, the quarter wave resonator 18 can be approximated as a cylindrical capacitor where the quarter wave resonator forms the inner cylinder with radius 30 and the outer cylinder is the surrounding environment of radius 32, as shown in FIG. 2 and Equation 4, below:

$$C = \frac{2\pi\varepsilon_0}{\ln\left(\frac{d}{a}\right)} e^{-\phi} \quad \text{(Equation 4)}$$

In Equation 4, co is the permittivity of free space. Note that the length (l) of the conventional cylindrical capacitor equation has been replaced with the non-linear term $e^{-\Phi}$. It is evident from Equation 4 that a small change in distance d of an approaching object will produce a nonlinear change in the capacitance. This in turn will cause a drastic change to the standing wave resonance, which is highly dependent on the spatial distribution of C given by Equation 2.

FIGS. 1 and 2 show an exemplary sensing system 10 including a quarter wave resonator 18 positioned to detect and respond to objects 22 as they approach the quarter wave resonator 18. In one embodiment, the resonator 18 can include 127 turns of 22-gauge wire wound around a 3.81 cm inch polyvinyl chloride (PVC) cylindrical tube and set at distance of approximately 152.4 cm from the remainder of the sensing system 10 circuitry to help reduce interference between the remaining circuitry and the resonator 18. The quarter wave resonator 18 was integrated into a Wheatstone bridge circuit 14 (as shown in FIG. 1, forming one branch of the bridge circuit 14 with a 200-ohm potentiometer 26 used to balance (zero) the output voltage 16). At the standing wave resonance, the quarter wave resonator 18 is resistive to the power source 12, allowing the use of a resistive based Wheatstone bridge circuit or similar resistive based nullification circuit 14.

In some embodiments the output voltage 14 of the nullification circuit 14, or leads extending from opposing sides or lines of the nullification circuit 14, can be fed to a differential operational amplifier 34 which can amplify (Gain=10) and condition the output voltage 16 waveform. In some embodiments, a function generator can be utilized as the source 12 of the nullification circuit 14 to bring the system to its resonance frequency. A suitable oscilloscope and/or AC/DC converter can be used to measure the output voltage 16 and electric field generated by the quarter wave resonator 18. When objects approach the resonator 18, the zeroed nullification circuit 14 becomes unbalanced as the quarter wave resonator's 18 impedance increases from being detuned. The magnitude of the output voltage 16 of the nullification circuit 14 can then be correlated to and used to indicate the distance of the object 22 from the resonator 18.

Figure 3:
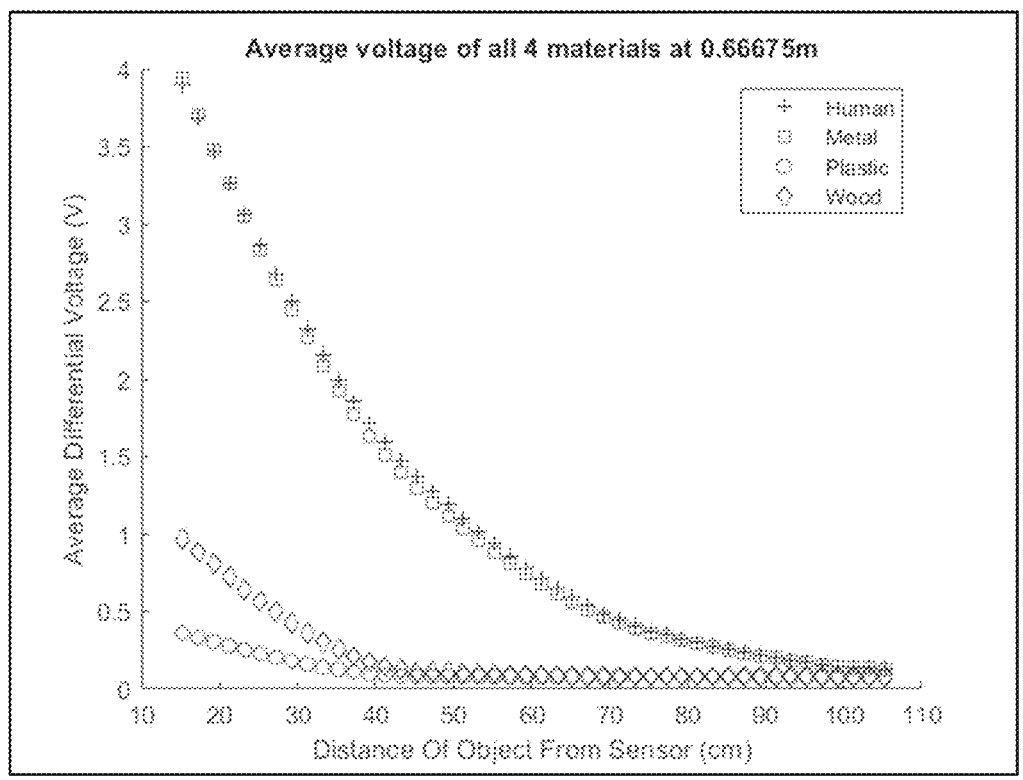
FIG. 3 is a graph of output voltages produced from the detection of objects of various materials by the sensing system at various distances away from the electrical medium.

Several different types of objects were utilized to test a single quarter wave resonator's 18 ability to detect different types of dielectric/conducting materials. Each object tested was placed around the quarter wave resonator 18 and moved to varying distances from the resonator 18. The size and type of objects tested included a 1.83 m by 0.92 m by 0.013 m wood sheet, a 1.08 m diameter by 2 m long plastic cylinder, a 0.4 m diameter by 2.4 m tall aluminum culvert, and the body of human. The results of this experiment are shown in FIG. 3. Objects that exhibited a conductive property, such as the metal culvert or humans (since humans are 98% salt water), were detected at a greater distance than those with more dielectric properties (wood and plastic). It should be noted however that both plastic and wood were still detectable when in close distance from the QWR sensor. While both objects were detected by the electrical medium 18 starting at a distance of 40 cm, the slope of the curves between the two were greatly different. In some embodiments, it may be possible to conduct a form of dielectric spectroscopy of the approaching material, allowing one to determine not just the distance but also the bulk material makeup of the object.

Depending on the type of material intended to be sensed in various applications, empirical data such as that shown in FIG. 3 can be used to calibrate a processor 40, such as a CPU, microprocessor, or microcontroller, which can be electrically connected to the output voltage 16 of the nullification circuit 14. The processor 40 can be operable to measure the output voltage 16 and determine the distance or position of the object from the electrical medium 18. The processor 40 can then be programmed to provide instruction or alter the functionality of an underlying system based on the determined distance or position of the object relative to the electrical medium 18. For instance in an electrical vehicle example, the sensing system 10 can detect a vehicle as it approaches the sensing system. The processor 40 can monitor the output voltage 16 as the vehicle approaches the sensing system to determine the distance or position of the vehicle relative to the electrical medium in the sensing system. The processor 40 can be programmed to provide instruction based on the detected position or distance of the vehicle. For instance, the processor 40 via a user interface can provide to turn the vehicle to the left or right, stop, back up, etc. based on the sensed position of the vehicle. The processor 40 can also be coupled to an underlying power transfer position and instruct the power transfer system to begin transferring power to the vehicle when the vehicle is in a desired or proper position within the power transfer system.

Figure 4:
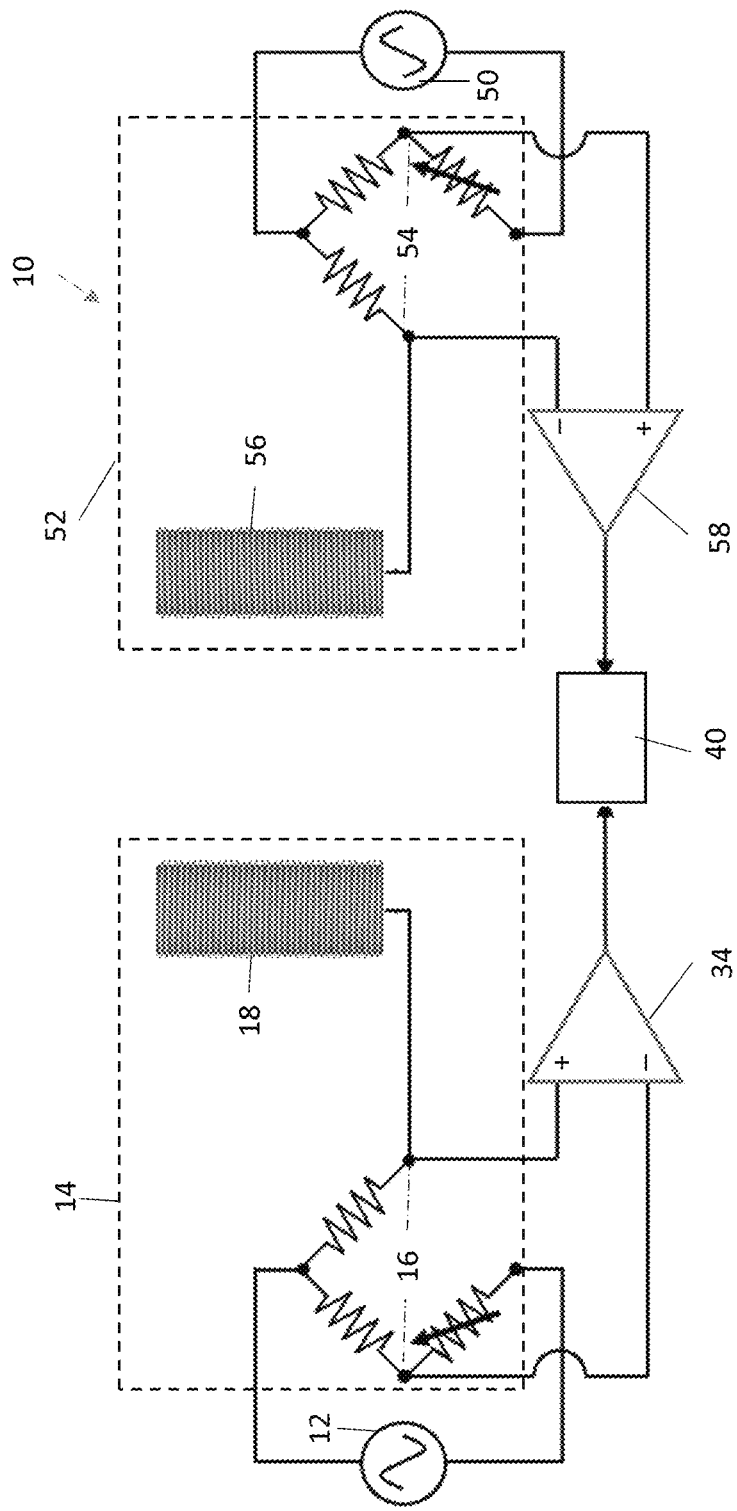
FIG. 4 is a circuit diagram of another embodiment of a sensing system of the present disclosure including multiple electrical mediums and associated nullification circuits for detecting a position and/or motion of an object to the electrical mediums.
Figure 5:
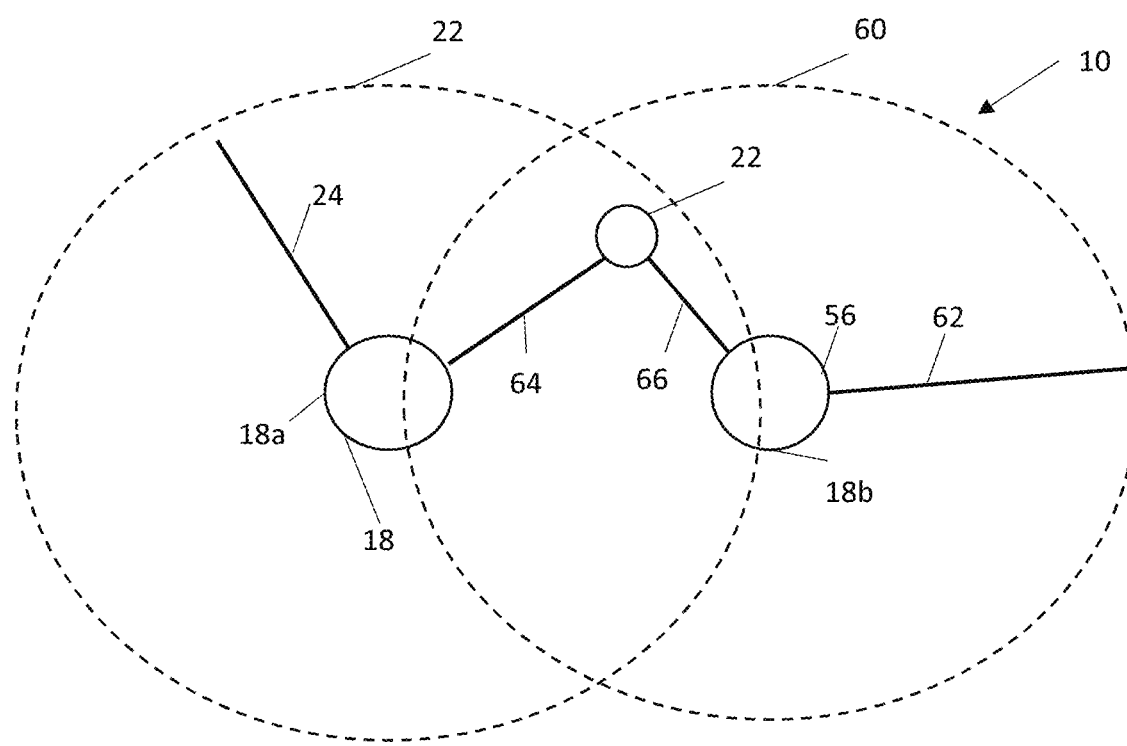
FIG. 5 is a schematic diagram of an object positioned within the electrical fields produced by the sensing system of FIG. 4.

In some embodiments, as shown in FIGS. 4-5, the sensing system 10 can include a second power source 50. A second nullification circuit 52 can be electrically connected to the second power source 50, the second nullification circuit 52 including a second output voltage 54. A second electrical medium 56 can be integrated into the second nullification circuit 52, the second electrical medium 56 producing a second standard wave electric field 60 about the second electrical medium 56 when power is supplied from the second power source 52 to the second electrical medium 56. The second nullification circuit 52 can be configured such that the second output voltage 54 of the second nullification circuit 14 is substantially zero when power is supplied to the second electrical medium 56 via the second power source 50 and the object 22 is not within a second predetermined minimum distance 62 from the second electrical medium 56, the second output voltage 54 of the second nullification circuit 52 having a non-zero value when the object 22 is within the second predetermined minimum distance 62 from the second electrical medium 56. In some embodiments, the first and second electrical mediums 18 and 56 can have similar structures such that the first and second minimum distances 24 and 62 can be substantially equal.

In some embodiments, both electrical mediums 18 and 56 can be quarter wave resonators 18 with matching bobbin dimensions and both nullification circuits 14 and 52 can be Wheatstone bridge circuits integrating respective quarter wave resonators 18 and 56. The quarter wave resonators 18 and 56 in some embodiments can be designed to operate at a different standing wave resonant frequencies, which can help to reduce the coupling between the two resonators 18 and 56. In some embodiments, the resonators 18 and 56 can be spaced apart from one another to help reduce interference between the two resonators 18 and 22. In some embodiments, the spacing between the resonators was approximately 30 cm. In other embodiments, the resonators 18 and 56 can be spaced apart from other another by a distance of between about 20 and 100 cm. Each resonator can produce their own overlapping electric field 22 and 60. When an object approaches from either side—or passes in front or behind the detector pair, the closest resonator 18 would detune at a quicker rate than its adjacent partner. The voltage differential measurement of each output voltage 16 and 54 of the separate Wheatstone bridge circuits 14 and 52 could be used determine a distance between the object 22 and each electrical medium 18 and 56 to indicate and track over time the direction and position of the object by triangulating the distances of the object 22 from each of the electrical mediums 18 and 56.

In such embodiments, a processor 40 can be electrically connected to the output voltage 16 of the nullification circuit 14 and the second output voltage 54 of the second nullification circuit 52. The processor 40 can be operable to measure the output voltage 16 from the nullification circuit 14 and determine a first distance 64 between the object 22 and the electrical medium 18 based on the measured output voltage 16 of the nullification circuit 14 as previously described herein. The processor 40 can also be operable to measure the second output voltage 54 from the second nullification circuit 52 and determine a second distance 66 between the object 22 and the second electrical medium 56 based on the measured second output voltage 54 of the second nullification circuit 52. The processor 40 can be operable to triangulate the position of the object 22 from determined distances 64 and 66 to determine and track the position, velocity, and direction of travel of the object 22. It will be readily apparent to one of skill in the art that addition power sources, nullification circuits, and electric medium can be utilized to create additional points of measurement for the movement of an object and can be potentially used to canvas a larger area of where an object may be positioned or moving.

A human passed by the sensor system 10 of FIGS. 4-5 at a distance 15.24 cm from each electrical medium 18 and 56. Output voltages 16 and 54 can be electrically connected to separate operational amplifiers 34 and 58 such that one output voltage 16 will be negative when an object is detected and one output voltage 56 can be positive when an object is detected. The amplified output voltages 14 and 56 can be measured by an oscilloscope. As can be seen from FIG. 18, as a human passes going left to right, a negative pulse is generated at the differential output followed by a rapid positive pulse as the human crosses the midway point between the two resonators. The speed of travel can be determined by the width of the pulse and the distance between the two resonators. Upon passing out of range of the resonators, the human turned around and went back in the same direction but at a quicker pace. This time the leading pulse is positive followed by a negative. The widths are narrower indicating that the human was moving faster. Similar measurements were taken as the human passed farther away from the resonators. When the human was further away, the signal intensity reduced, yet the speed and position were still detectable. Correlating both these components, one can achieve a velocity (speed and position) of any given object that approaches or passes the sensing device.

Figure 18:
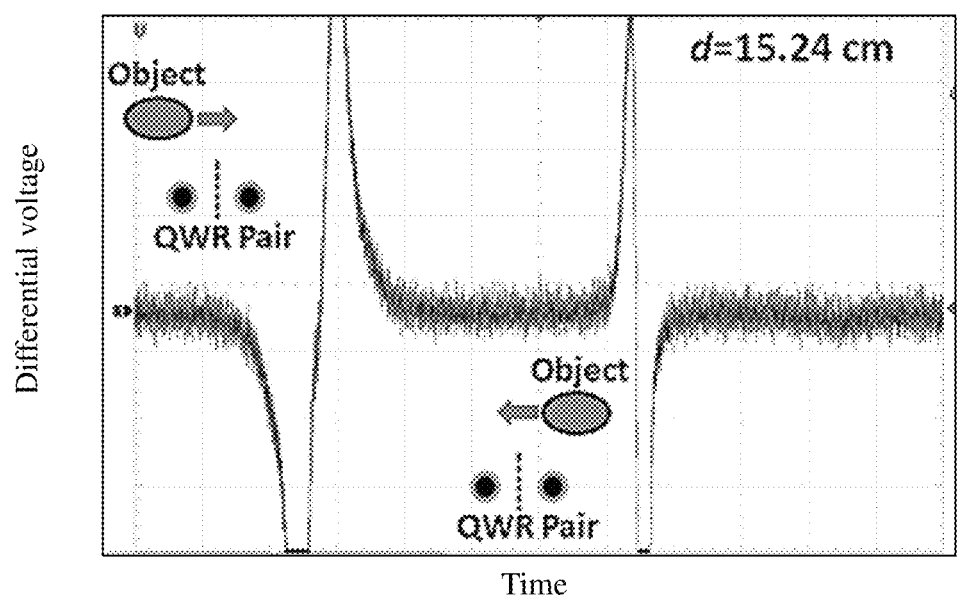
FIG. 18 is a schematic view of an oscillator screen observing a human passing by electrical mediums of the sensing system of FIGS. 4 and 5.

By looking at FIG. 18, the speed of the human passing was approximated at 1.22 m/s during the walking phase and 2.03 m/s during the running phase. This was determined by taking the distance traversed, as measured from the crossover (dashed line), and dividing it by the pulse width. Mathematical functions can be generated from the data in FIG. 18 that can accurately predict velocity using both signal shape, intensity, and pulse width. This will enable the system to achieve a more accurate velocity prediction for conductive and dielectric objects that approach/pass the sensing device.

The detection range of a quarter wave resonator is a function of the quarter wave resonator geometry. The electric field of the quarter wave resonance has a unique ability to detect both conducting and dielectric materials. This sets the quarter wave resonator apart from conventional sensing devices (such as magnetic sensors) which can only detect conductive objects. Such a capacitive omnidirectional proximity sensor could be easily integrated into wireless power transfer systems that are currently utilized for electric vehicle charging. This would offer larger detection ranges of not only electric vehicles, but of interferants as well, such as objects positioned between the power transfer coils and the receiver coils on the electric vehicle. The quarter wave resonator would be capable of detecting the velocity of an approaching electric vehicle as it enters the designated charging area.

A quarter wave resonator can be modeled as a lossless transmission line where the unit length inductive elements are mutually coupled (FIG. 6)—defined as a mutually coupled T-line. The coupling that one discrete section has on the next is an unknown, as one section will be coupled to multiple sections. The coupling will therefore be extended to an $x_1+m$ distance along the quarter wave resonator (where m is the number of sections influenced by the first section's magnetic field). The assumption is that the quarter wave resonator is significantly lengthy so that the $x_1+m$ distance is not the entire length of the resonator, but only some small portion. The capacitive element of each section may have a length different from the inductive element and is therefore defined as x'. The per unit value of self-inductance (L) and self-capacitance (C) are assumed equal for each section, restricting the influence of coupling to only a distance dependence along the quarter wave resonator. A set of circuit analysis equations result that are dependent on an unknown distribution of lengths along the resonator. A special resonance condition is assumed where each unit section has the exact same resonant frequency ($\omega_0$) as the next, and each coupled portion of sections also exhibited this same resonant frequency ($\omega_0$). In this way a set of solutions can be obtained.

Figure 6:
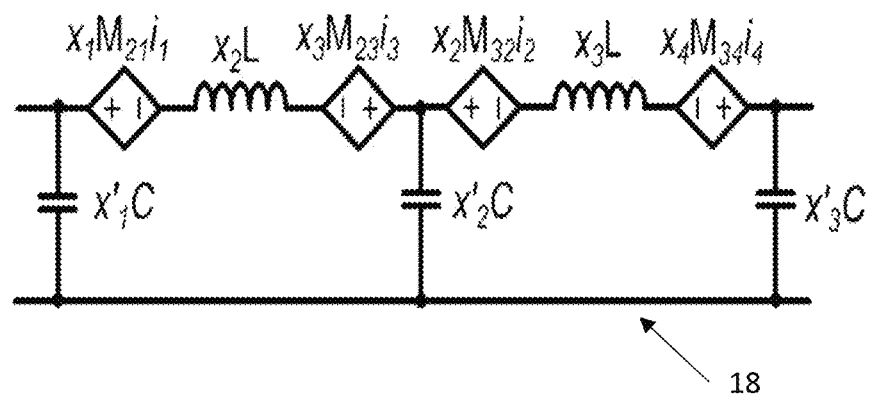
FIG. 6 is a circuit diagram of an exemplary electrical medium of the present disclosure used to detect the position or motion of an object.

The generalized solutions, using Kirchhoff's law and working left to right in FIG. 6, for (x, x') are found to be:

$$x_m = \frac{X^{\frac{m}{2}}}{\sqrt{m!}}, \text{ for all } m > 0 \quad \text{(Equation 5)}$$

$$x'_m = (-1)^m m! X^{-m}\left(\frac{X^{m-2}}{\sqrt{(m-1)!}} + \frac{X^{m+2}}{\sqrt{(m+1)!}}\right) \quad \text{(Equation 6)}$$

In Equations 5 and Equation 6, m is the µcT-line section, $x_0=0$, and a negative $x_m'$ indicates the length contribution coming from an adjacent, left-hand section. The square of this special resonant frequency ($\omega_0$) produces a unique spatial distribution where X defines a position along the quarter wave resonator with a summation series that can be approximated as:

$$\omega_0^2 = \frac{1}{LC}\frac{[\cosh(X) - \sinh(X)]}{[\cosh(X) + \sinh(X)]} = \frac{1}{LCe^{2X}} \quad \text{(Equation 7, above)}$$

The propagation velocity (vp) and phase constant ($\beta$) become:

$$v_p = \frac{e^{-x}}{\sqrt{LC}} \quad \text{(Equation 8)}$$

$$\beta = \omega_0 \sqrt{LC}\, e^x \quad \text{(Equation 9)}$$

Equation 8 and Equation 9 are functions of the spatial distribution. The interpretation of this derivation is the propagation velocity of a wave at ($\omega_0$) that enters the quarter wave resonator will exponentially reduce in speed. The medium that the quarter wave resonator presents to the wave appears non-homogenous with an exponentially increasing wavenumber. To maintain the same frequency across the entire $\mu$cT-line, the speed of the wave must reduce as it propagates to account for the increasing wavenumber.

The impedance from the input moving left to right along the $\mu$cT-line was derived to be:

$$Z = \omega_0 L e^{\Phi} \quad \text{(Equation 10)}$$

with X being replaced with the spatial phase ($\Phi$), that is, the phase where distance is equated to radians:

$$\Phi = \frac{2\pi n X_i}{\sum X_i} \quad \text{(Equation 11)}$$

where the summation of Xi is viewed as the total length of the $\mu$cT line and n is the wave mode. For a quarter wave resonator, n=¼ and Equation 11 becomes:

$$\Phi = \frac{\pi}{\lambda} X_i \quad \text{(Equation 12)}$$

The voltage distribution along the $\mu$cT-line occurs in a gradient along the length. Being a voltage, its value must be taken with respect to a common (usually the source's neutral). Each position will also have a potential difference with respect to the adjacent positions on either side. This produces an additive voltage when measured along the length with respect to the neutral (similar to what would be observed in a conventional transformer as one measures the voltage moving along the windings from a common point). The voltage may be found by multiplying the current (which is non-linear, unlike a conventional transformer) by the integral of the impedance between the spatial beginning and end of the resonator. The voltage distribution along the quarter wave resonator becomes:

$$V = Z I_S (1 - e^{-\Phi}) \quad \text{(Equation 13)}$$

producing an exponential voltage variation along the resonator.

Equation 13 will be used to derive the influence of the surrounding stray capacitance with respect to distant external influences (such as approaching objects). In validation Equation 13, a non-contact measurement was conducted along different points of the resonator. Non-contact is required since a probe in direct contact with the resonator will drastically alter the T-line characteristics and change the system operation completely.

Figure 7:
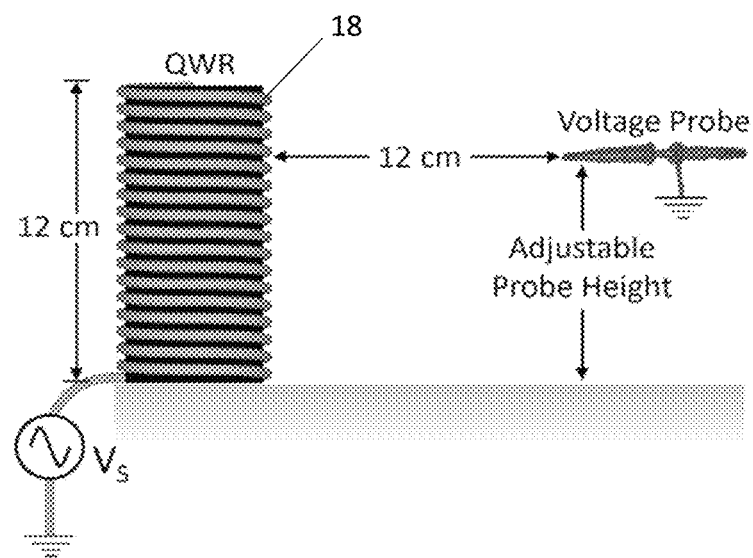
FIG. 7 is a schematic diagram of system for verifying the magnitude of an electric field produced along a length of an electrical medium including a quarter wave resonator.
Figure 8:
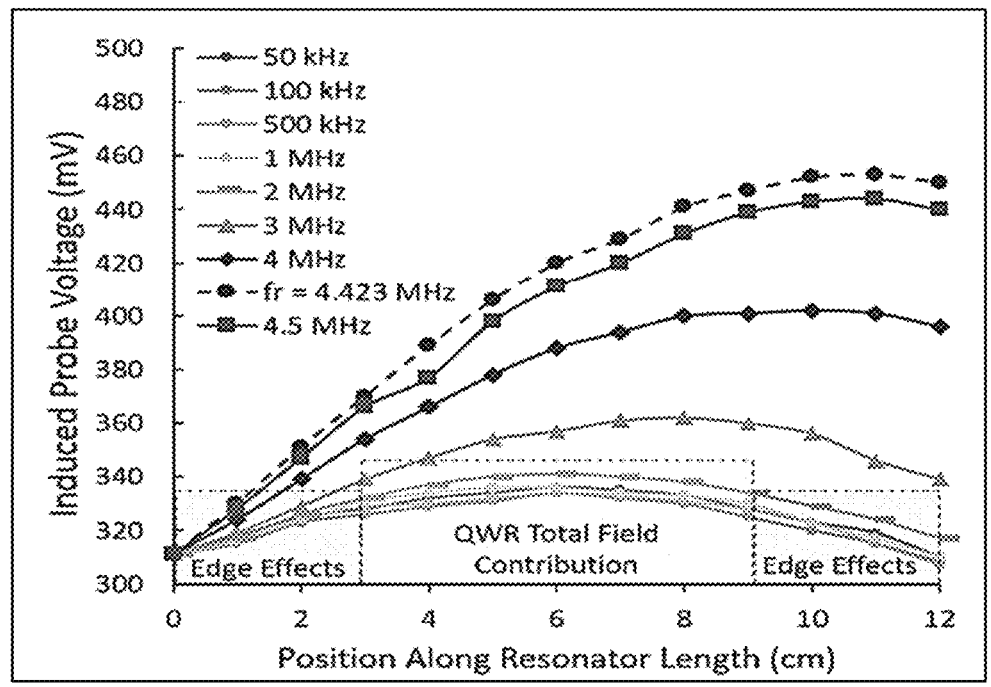
FIG. 8 is a graph of induced voltages produced by an electrical field of the quarter wave resonator of FIG. 7 at various positions along the resonator and at various frequencies.

A voltage probe was placed 12 cm from the quarter wave resonator in order to make a non-contact measurement (FIG. 7). When taking the measurement in this manner, the induced voltage measured is due to a superposition of electric field vectors that emanate from all regions of the quarter wave resonator's surface following a path from the quarter wave resonator surface to the probe tip. Thus, measurements taken at either the bottom or top edges of the quarter wave resonator should be lower, since the quarter wave resonator surface ends at those locations. In the center, the measurements should have a higher expected intensity since all electric field contributions from the surface can occur. This is more easily seen if the quarter wave resonator is driven at a frequency well below its standing wave resonance, allowing charges to distribute uniformly along the quarter wave resonator. FIG. 8 shows the non-contact distribution measurements where the quarter wave resonator is driven at frequencies starting at 50 kHz to a maximum of 4.5 MHz (beyond the standing wave resonance of 4.423 MHz). For frequencies below 1 MHz, charges are distributed uniformly along the resonator's surface. It is only until about 2 MHz that the charge distribution starts to become non-linear. For frequencies with uniform charge distribution, the probe voltage measures the highest value when in the center of the quarter wave resonator—as expected. In contrast, when the quarter wave resonator is driven at its standing wave resonance (4.423 MHz), the maximum charge resides at the free end of the resonator. The edge effects are still present, but the non-linear charge distribution makes these difficult to observe.

Figure 9:
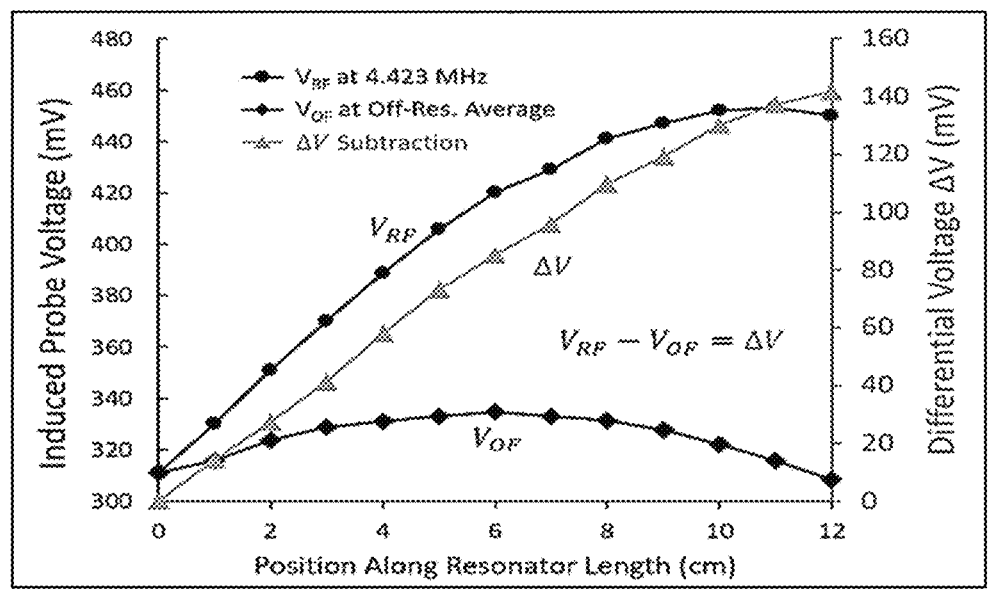
FIG. 9 is a graph of induced voltages produced by an electrical field of the quarter wave resonator of FIG. 7 and differential voltages produced in a nullification circuit electrically connected to the quarter wave resonator.
Figure 10:
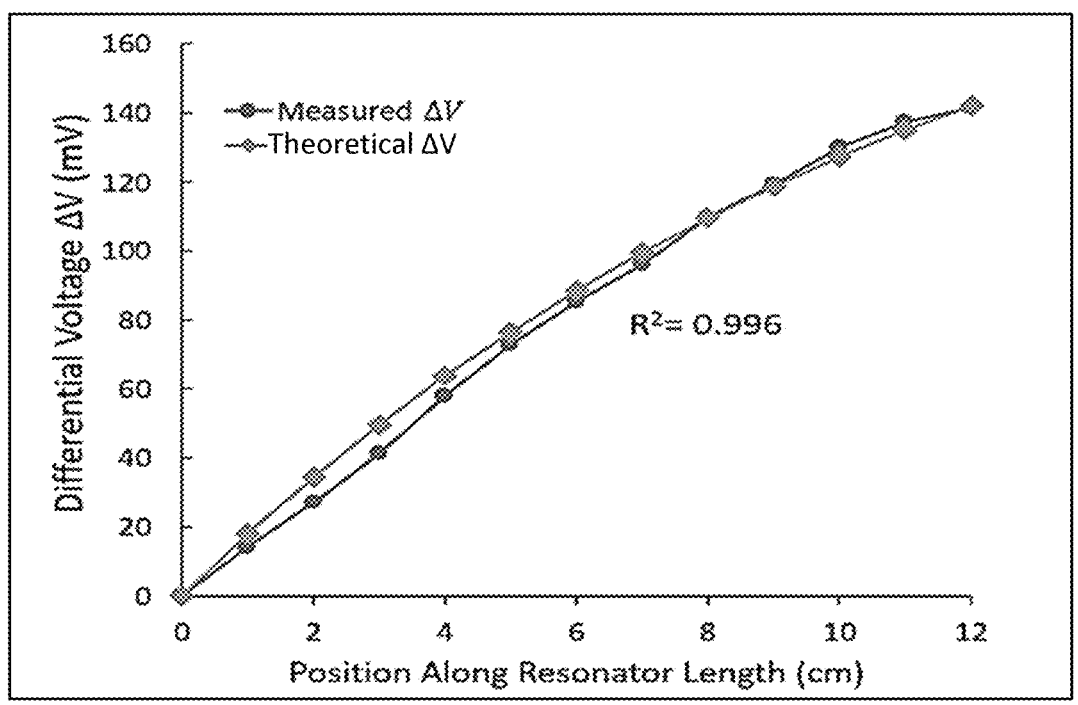
FIG. 10 is a graph of measured voltage differentials versus theoretical voltage differentials at various lengths along the resonator of FIG. 7.

Equation 13 allows one to determine the voltage at an $X_i$ location along the quarter wave resonator so that the voltage distribution at any location can be calculated. For the non-contact experimental measurements to be useful, the effects of the electric field contributions from other $X_i$ locations above and below the measurement point must be removed. By subtracting the probe voltage at resonance ($V_{RF}$) with the average off-resonance probe voltages ($V_{OF}$, 50 kHz through 1 MHz plots), the differential voltage ($\Delta V$) is obtained (FIG. 9). $\Delta V$ directly follows the voltage distribution obtained in Equation 13, having a correlation coefficient of 0.996 as shown in FIG. 10. Equation 13 may therefore be a valid approximation to predict the voltage distribution along a quarter wave resonator.

In the setup shown in FIG. 7, the resonator 18 is a coil comprised of 127 turns of 22-gauge wire around a 3.81 cm polyvinyl chloride (PVC) cylindrical tube. The coil was set at approximately 1.5 m from the main circuit and attached to a Wheatstone bridge, differential operational amplifier circuit utilizing a 8014 A amplifier. The op amps were supplied power by a BK Precision 1760 A DC Power Supply. The system was supplied with a signal from a 33120 A, 15 MHz Function Generator. A Tektronix THS3014 oscilloscope was used to find the resonate frequency of the designed coil.

In some embodiments, the height of the resonator 18 above the ground or other reference surface can be adjusted depending on the height of the object to be detected to help optimize detection of the object by the resonator 18. In one example, shown in FIG. 11, the resonator 18 was placed at three different heights of 0.057 m, 0.327 m, and 0.67 m from the floor and an aluminum cylinder was place at varying radial distances from the resonator 18. In another example, shown in FIG. 12, the resonator 18 was placed at three different heights of 0.057 m, 0.327 m, and 0.67 m from the floor and a human stood at varying radial distances from the resonator 18.

Figure 11:
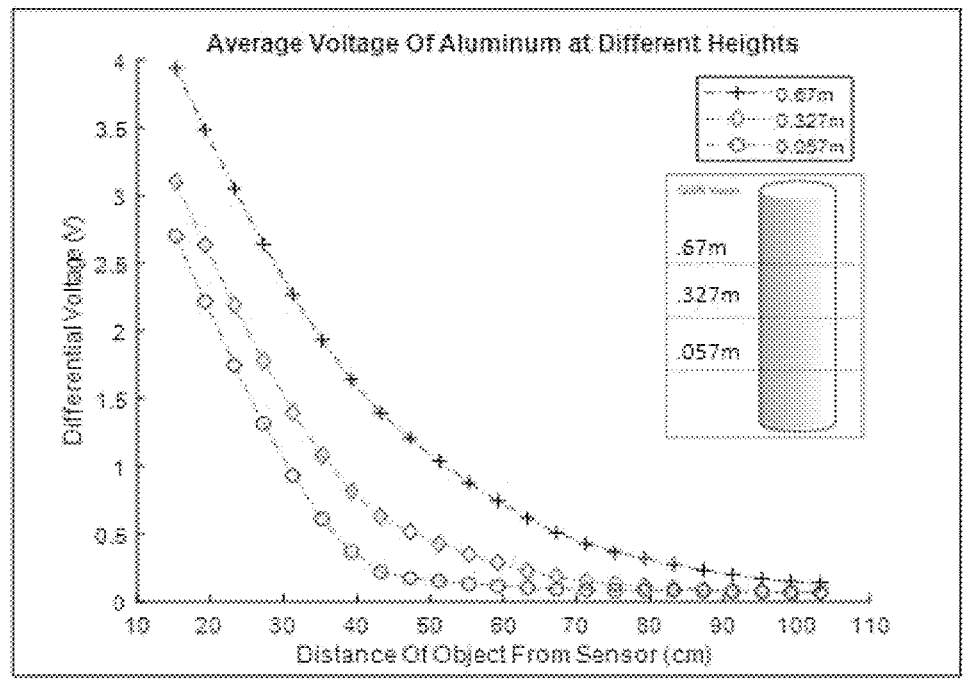
FIG. 11 is a graph of measured differential voltages detected when an aluminum object is placed at varying distances from a quarter wave resonator of a sensing system of the present disclosure and the quarter wave resonator is moved vertically relative to the aluminum object.
Figure 12:
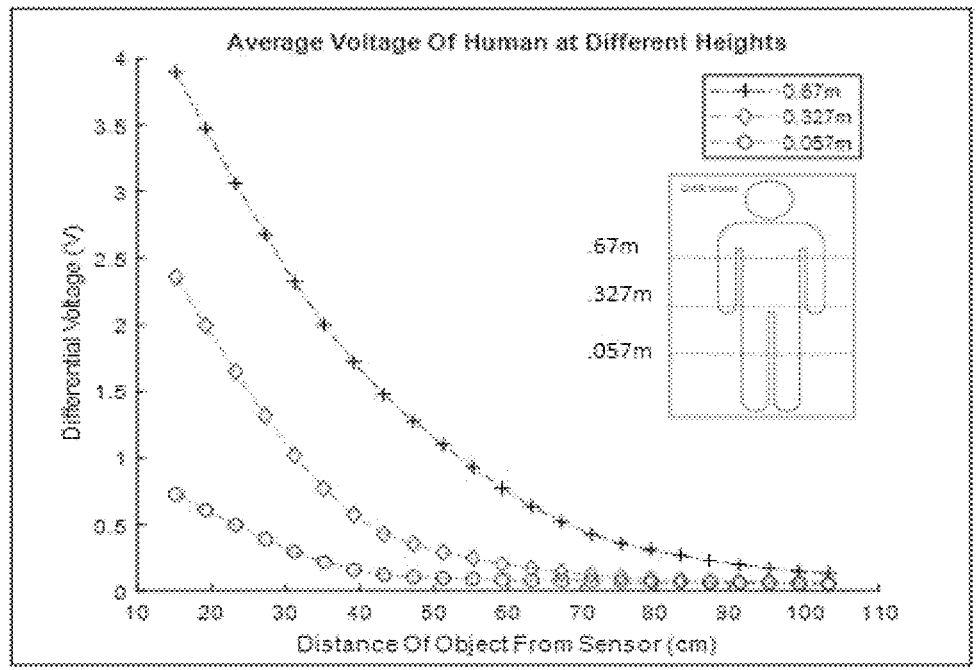
FIG. 12 is a is a graph of measured differential voltages detected when an human is positioned at varying distances from a quarter wave resonator of a sensing system of the present disclosure and the quarter wave resonator is moved vertically relative to the human.

The differential graphs in FIGS. 11 and 12 have approximately the same voltage curve when the resonator 18 is 0.67 m from the floor, but the change in surface area vastly changes as the quarter wave resonator 18 gets closer to ground. Humans have a larger surface area when comparing the upper body versus the lower body. The electric field is able to see a larger surface area like the aluminum culvert at approximately 15 cm further away than a human body. Another observation is the large change in slope and maximum voltage response the system produces as it is lowered from 0.67 m to 0.057 m from the floor. The coupling of the resonator 18 with the floor greatly increases which therefore decreases the size, shape and visibility of the electric field.

Figure 13:
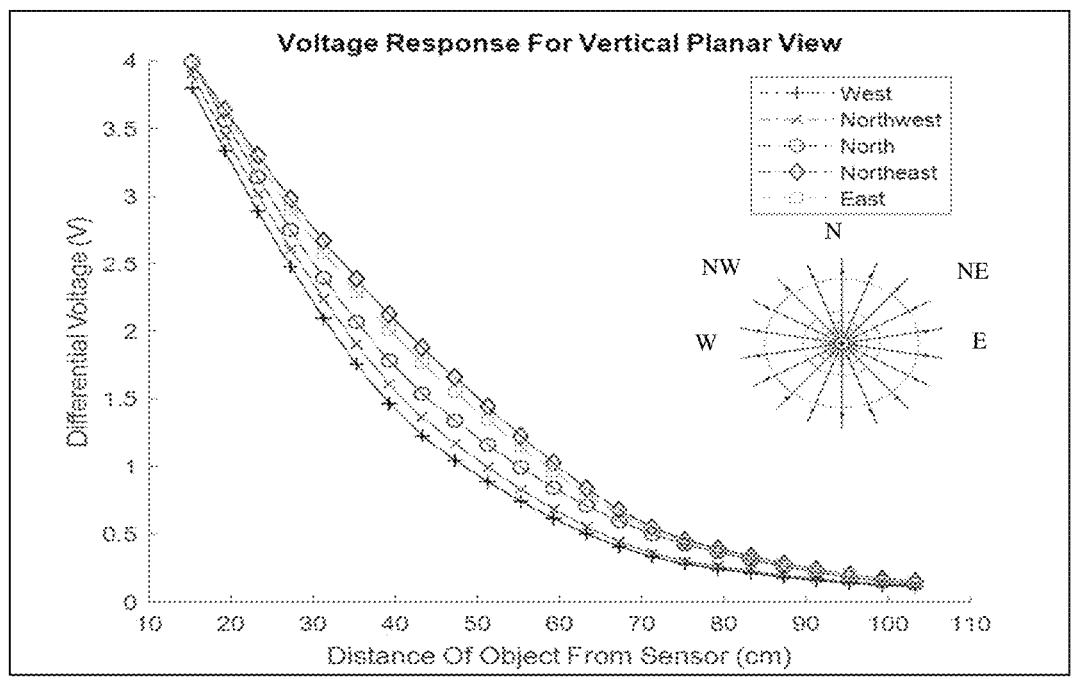
FIG. 13 is a graph of differential voltages at varying distances away from a quarter wave resonator of a sensing system of the present disclosure in various directions.

FIG. 13 shows a plot of the differential voltages produced by the resonator as an object approaches the resonator from varying directions when the quarter wave resonator 18 is oriented horizontally with the floor. The quarter wave resonator was moved from a vertical position by 90 degrees to a horizontal position on the mount at 0.67 m from the floor. The voltage was then measured at the previous equipotential markers to see the shape and dispersion of the electric field.

Figure 14:
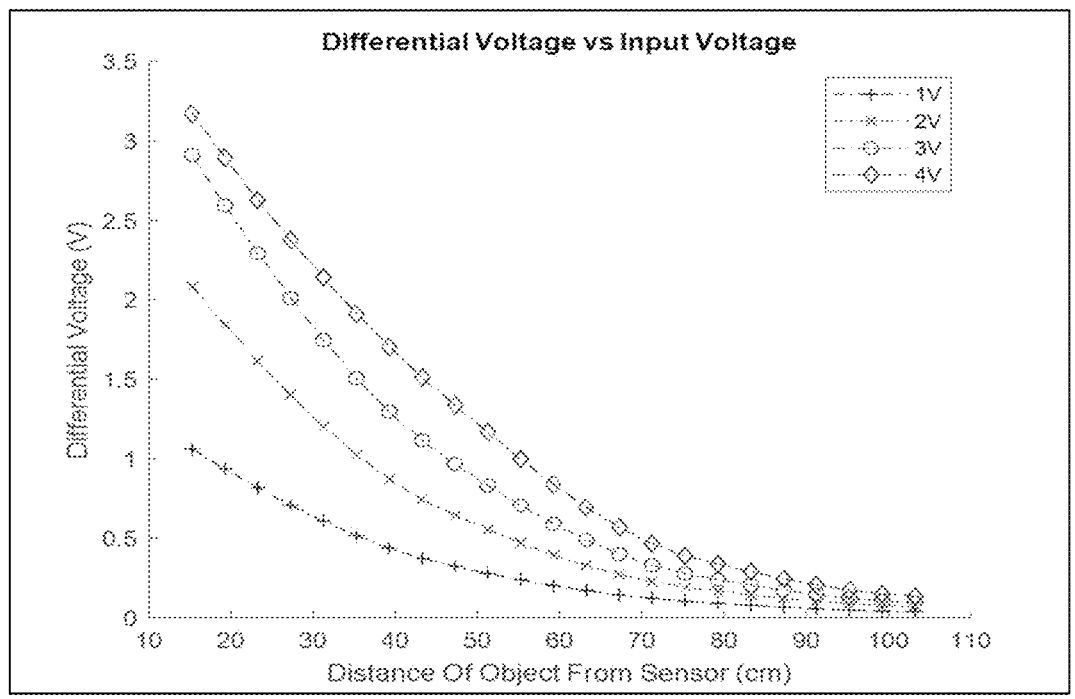
FIG. 14 is a graph of differential voltages at varying distances away from a quarter wave resonator of a sensing system of the present disclosure and at various input voltages from a power source of the sensing system.

FIG. 14 is a graph of the change in voltage the resonator produces as the sensing system receives more input voltage from the power source. The resonator reacts to a human at approximately the same distance even with an increase in input voltage. The electric field's intensity or magnitude linearly changes with the input voltage, but the size or shape is not affected. The sensitivity of the voltage causes subtle changes at lower voltages than at higher voltage. The quarter wave resonator was placed with the top of the coil pointing towards the east in FIG. 14. The voltage does approximately stay the same across the equipotential grid layout, but electric field does give an ovoid shape. The ovoid shape is shaped like an egg that has the top pointing in the direction of the transmitting end of the quarter wave resonator. It is thus apparent that the physical size and shape of the electric field produced by an electrical medium such as a quarter wave resonator is directly related to the physical characteristics of the electric medium which could include width, length and cross-sectional area etc.

Figure 15:
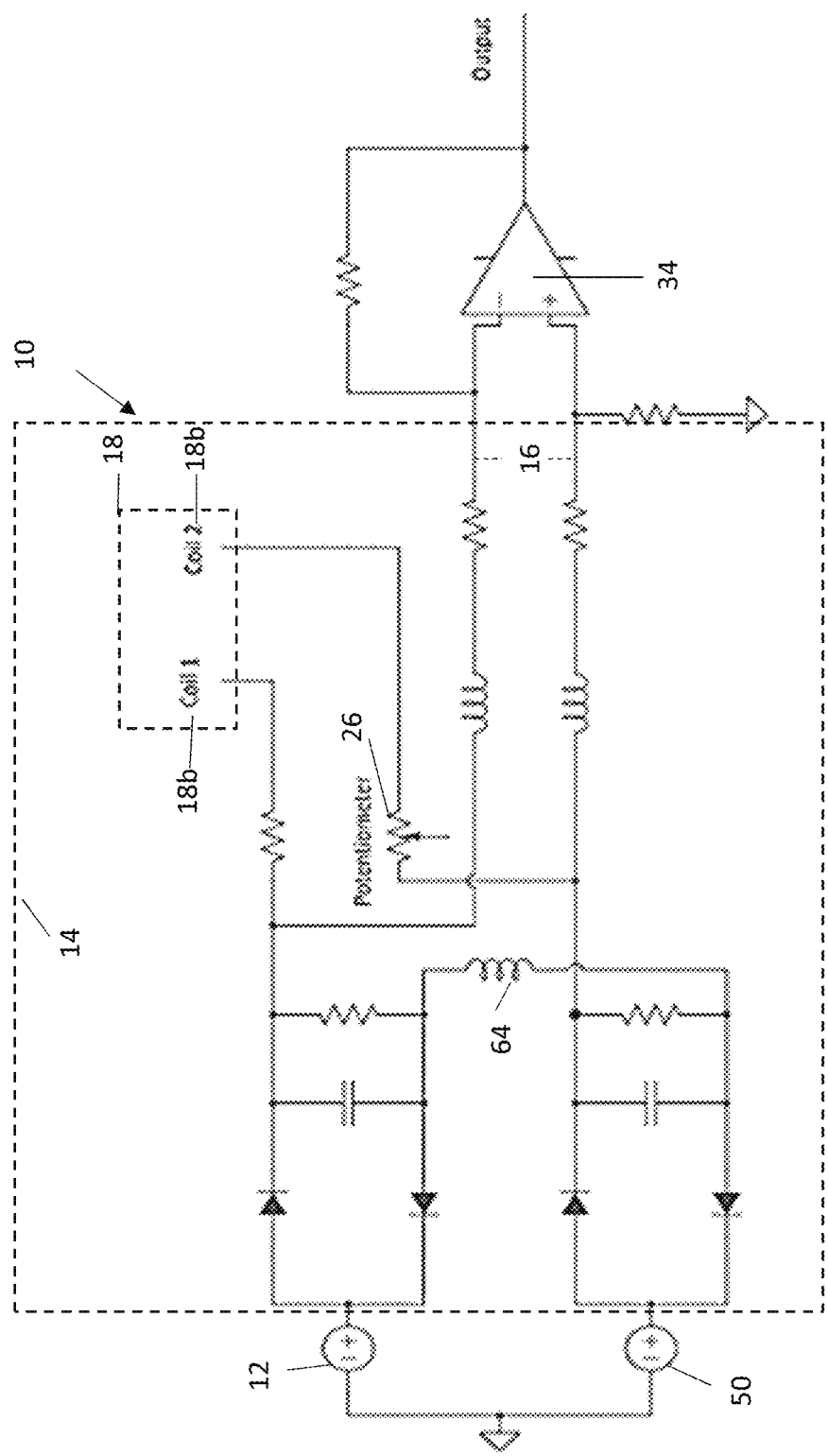
FIG. 15 is a circuit diagram of another sensing system of the present disclosure including two electrical mediums integrated into a single nullification circuit.

In some embodiments, as shown in FIGS. 5 and 15, the electrical medium 18 can include a first electrical medium 18a and a second electrical medium 18b, each of the first and second electrical mediums 18a and 18b being integrated into the nullification circuit 14. The sensing system 10 can include a second power source 50, the power source 12 providing power to the first electrical medium 18a and the second power source 50 providing power to the second electrical medium 18b, the power source 12 and the second power source 50 being isolated from one another within the nullification circuit 14, the second electrical medium 18b producing a second standard wave electric field 62 about the second electrical medium 18b when power is supplied from the second power source 50 to the second electrical medium 18b. The output voltage 16 of the nullification circuit 14 of FIG. 15 can represent a voltage differential between the power supplied to the first electrical medium 18a from the power source 12 and the power supplied to the second electrical medium 18b from the second power source 50.

Whether the differential is positive or negative can help determine which electrical medium 18a or 18b the object is close two at any given point. The nullification circuit 14 can include an induction choke coil 70 which can isolate the two power supplies from the first and second power sources 12 and 50.

The nullification circuit 14 can include a voltage balancer 26, shown as a potentiometer or adjustable resistance device in FIG. 15, such that the nullification circuit 14 can be configured such that the output voltage 16 of the nullification circuit 14 can be substantially zero when power is supplied to the first electrical medium 18a from the power source 12, power is supplied to the second electrical medium 18b from the second power source 50, and the object 22 is not within a predetermined minimum distance 24 from the first electrical medium 18a or within a second predetermined distance 62 from the second electrical medium 18b. The output voltage of the nullification circuit can have a non-zero value when the object 22 is within the predetermined minimum distance 24 from the first electrical medium 18a or when the object 22 is within the second predetermined minimum distance 62 from the second electrical medium 18b.

Figure 16:
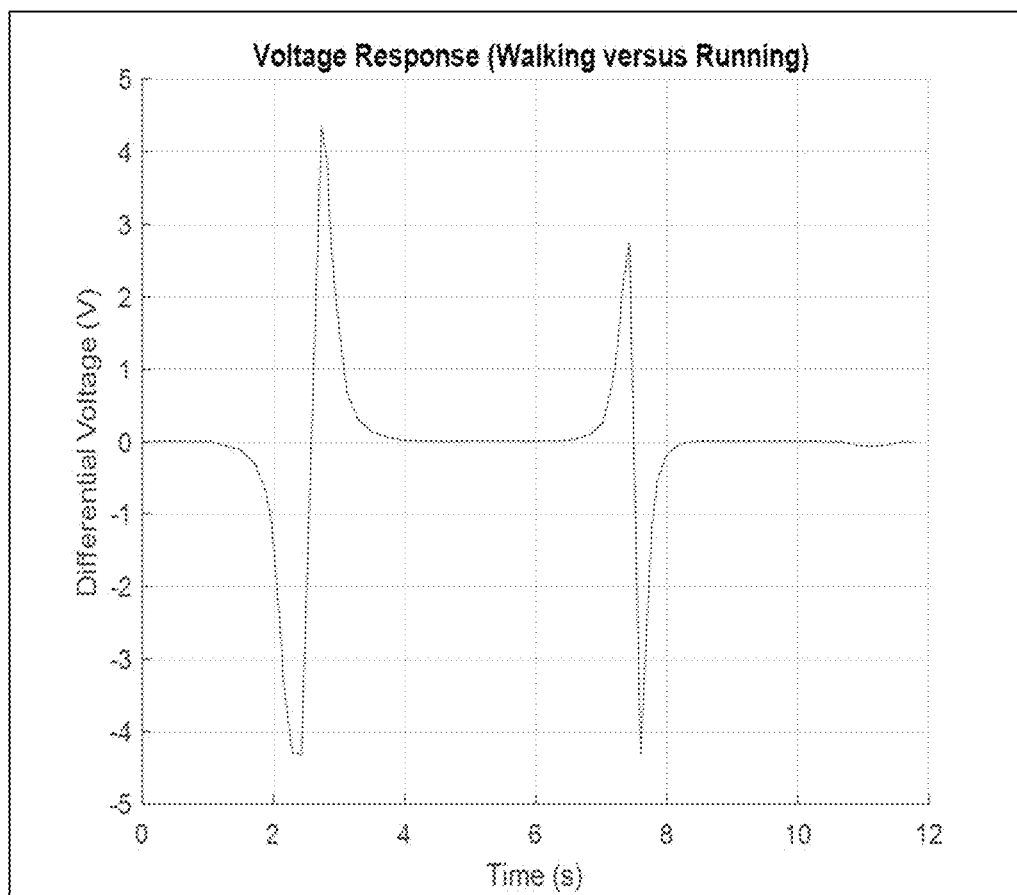
FIG. 16 is a plot of differential voltages over time generated from a human walking and running past the electrical mediums in the system of FIG. 15 in a direction substantially parallel to a line extending between the electrical medium.

FIG. 16 shows a plot of the differential voltage over time as a human walks and runs passed the first and second electrical mediums 18a and 18b in a parallel fashion (similar to the process discussed for FIG. 18). The velocity and distance of the object or the human or a similar object can be determined in a similar fashion from the known distance traveled and the pulse widths of the differential voltage plots shown in FIG. 16. In FIG. 16, the running portion does have the same negative voltage peak as the walking portion, but the positive cannot keep up the same as the negative. This is likely caused by the speed of the operational amplifier 34 not the detection speed of the electrical mediums 18a and 18b. The speed of the object passing through the pair of resonator's detection zone can be determined by looking at the pulse width. The voltage peak is directly related to the distance travelled. A human walked across the 2.1 m distance at approximately 3.1 seconds and then turned around and jogged back across at approximately 1.8 seconds. With this it can be determined that the human was moving at 0.68 meters per second walking speed and jogging at 1.17 meters per second.

Figure 17:
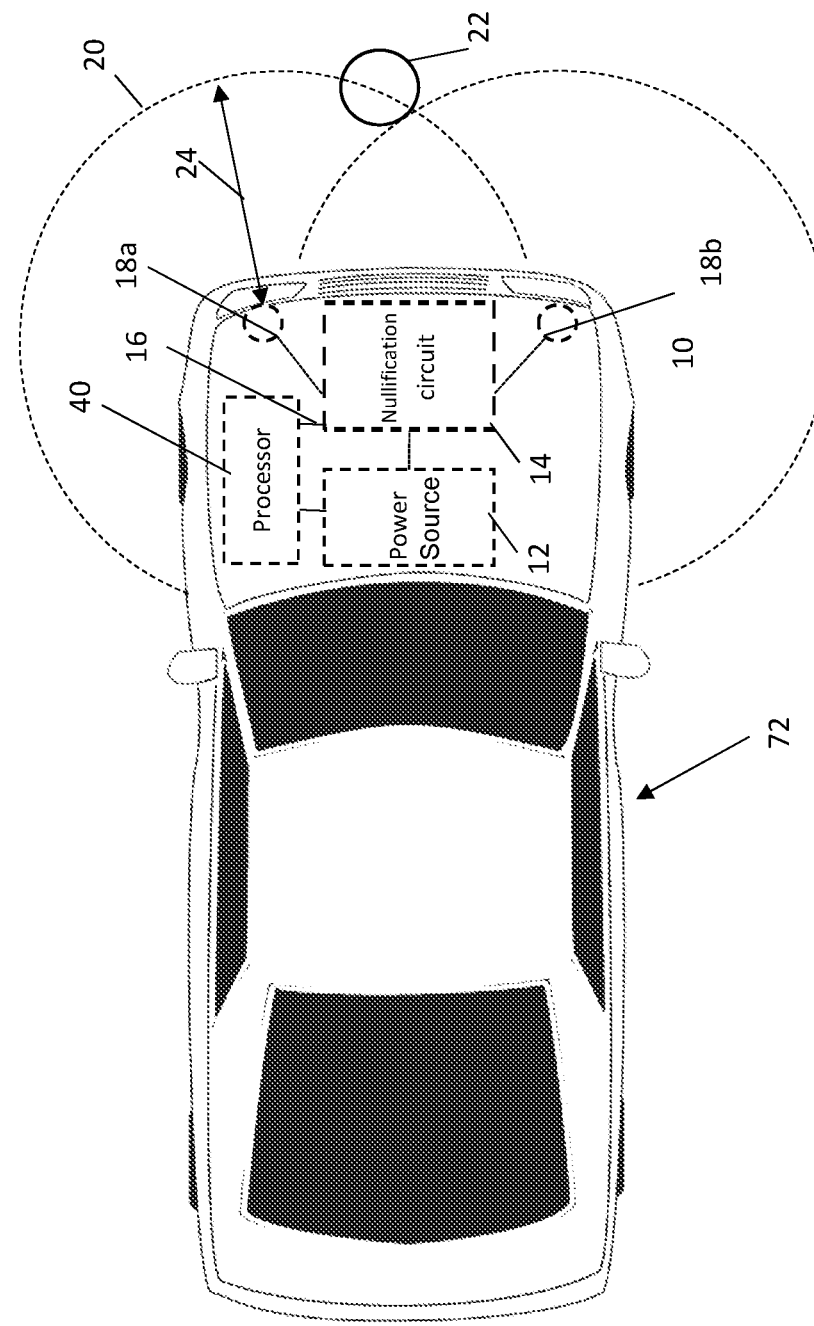
FIG. 17 is a top view of another embodiment of the sensing system of the present disclosure wherein the sensing system is mountable to or incorporated into a vehicle.

In some embodiments, as opposed to the sensing system being disposed about a wireless power transfer station and set up to detect a vehicle utilizing the wireless power transfer station, the sensing system 10 can be mountable to a vehicle 72 as shown in FIG. 17, and the sensing system 10 can be utilized to sense the position of a vehicle on which the sensing system is mounted relative to another object 22, such as a guide post or a power transfer coil of a wireless power transfer station. The sensing system 10 can still include a power source 12 and a nullification circuit 14 electrically connected to the power source 12, the nullification circuit 14 including an output voltage 16. One or more electrical medium 18 can be integrated into the nullification circuit 14, the electrical medium 18 producing a standing wave electric field 20 about the electrical medium 18 when power is supplied from the power source 12 to the electrical medium 18. The sensing system 10 can be mountable to the vehicle 72 and the nullification circuit 14 can be configured such that the output voltage 16 of the nullification circuit 14 can be substantially zero when the sensing system 10 is mounted to the vehicle 72, power is supplied to the electrical medium 18 and the object 22 is not within a predetermined minimum distance from the electrical medium 18. The output voltage 16 of the nullification circuit 14 having a non-zero value when the object is within the predetermined minimum distance 24 from the electrical medium 18. As noted previously, more than one electrical medium can be utilized with the various circuitry topographies disclosed herein to provide additional sensors and distance measurements to help determine the position, velocity, and direction of motion of the object 22 over time.

In some embodiments, the power source 12 can be the power source for the vehicle 72 itself, such that the sensing system 10 does not require a standalone power source. The onboard computer or processor 40 on the vehicle can also be electrically connected to the output voltage 16 of the nullification circuit 14 such that the vehicle's 72 on board computer or processor 40 can monitor the output voltages 16 of the sensing system 10, determine distances, velocities, and movement directions of detected objects 22 as described previously herein, and provide instructions to a driver or to a nearby power station accordingly, through an onboard user interface with respect to instructions sent to a driver of the vehicle 72 or through wireless telemetry with respect to instructions sent to a wireless power transfer station.

Figure 19:
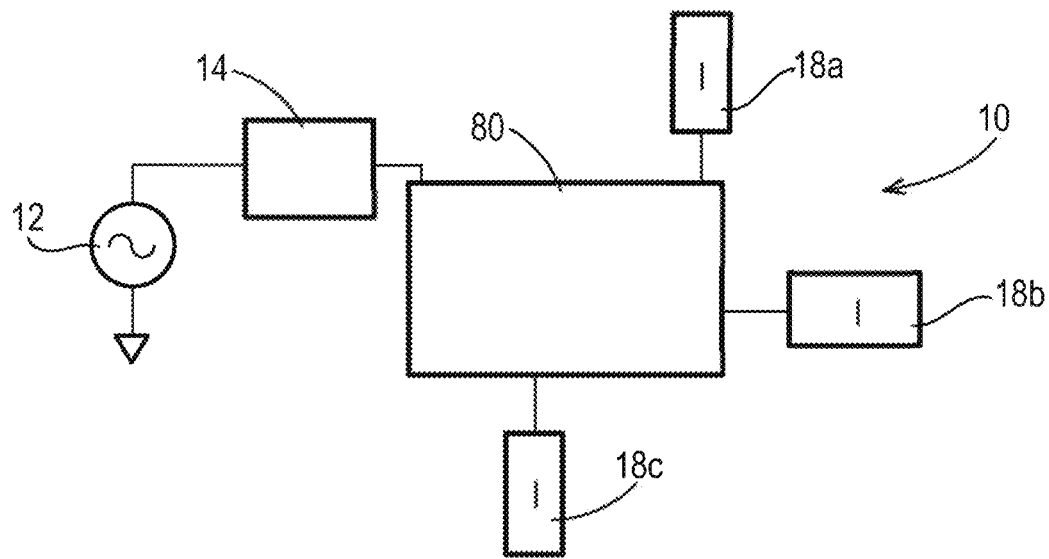
FIG. 19 a schematic view of another embodiment of a sensing system of the present disclosure wherein a conductive element is in electrical contact with one or more electrical mediums, such that power from a power source is passed through the conductive element to the electrical mediums.

FIG. 19 provides an additional embodiment a sensing system 10 of the present disclosure schematic view of another embodiment of a sensing system of the present disclosure wherein a conductive element 80 is in electrical contact with one or more electrical mediums 18a, 18b, and 18c, such that power from a power source 12 is passed through the conductive element 80 to one or more electrical mediums 18a, 18b, and 18c. Nullification circuits 14 and other circuitry and components previous described herein can be utilized for the embodiment shown in FIG. 19 with the addition of the conductive element 30 providing power to the electrical elements. The conductive element 80 can be any suitable conductive body that can pass electrical power through the inductive element, including but not limited to, a conductive building or structure, a vehicle chassis, etc. This can allow the sensing systems 10 described herein to be retrofitted to conductive elements or structures without having to route wires through or around the conductive elements or structures 80. Having a conductive element 80 can allow the electrical medium 18 to be readily placed at any location on the conductive element 80 and in various orientations as desirable.

Figure 20:
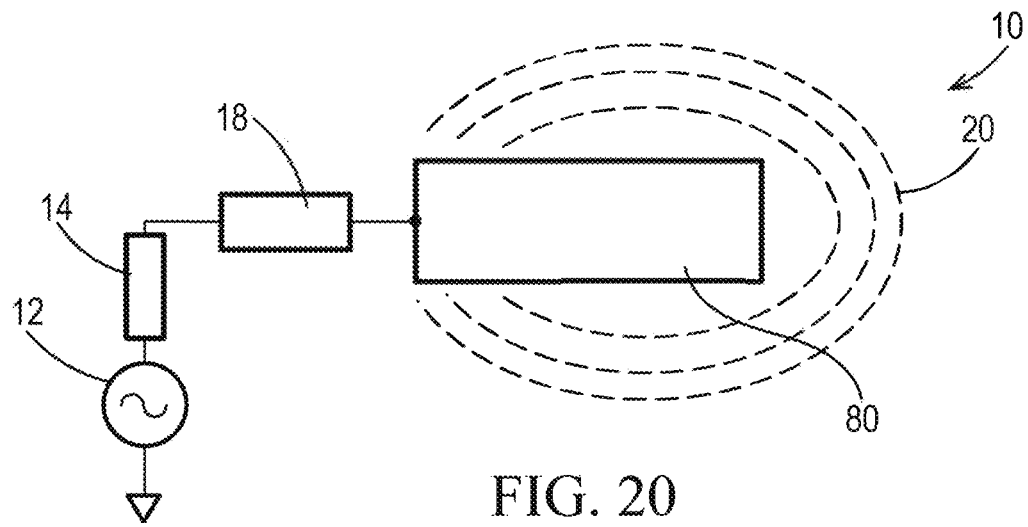
FIG. 20 is a schematic view of another embodiment of a sensing system of the present disclosure wherein a conductive element is in electrical contact with an electrical medium and an electric field produced by the electrical medium is propagated via the conductive element.

FIG. 20 is a schematic view of another embodiment of a sensing system 10 of the present disclosure wherein a conductive element 80 is in electrical contact with an electrical medium 18 and an electric field 20 produced by the electrical medium 18 is propagated via the conductive element 80. The conductive element 80 can be placed near the detection zone of a desired object while the electrical medium 18 can be protected in a more distant location.

Figure 21:
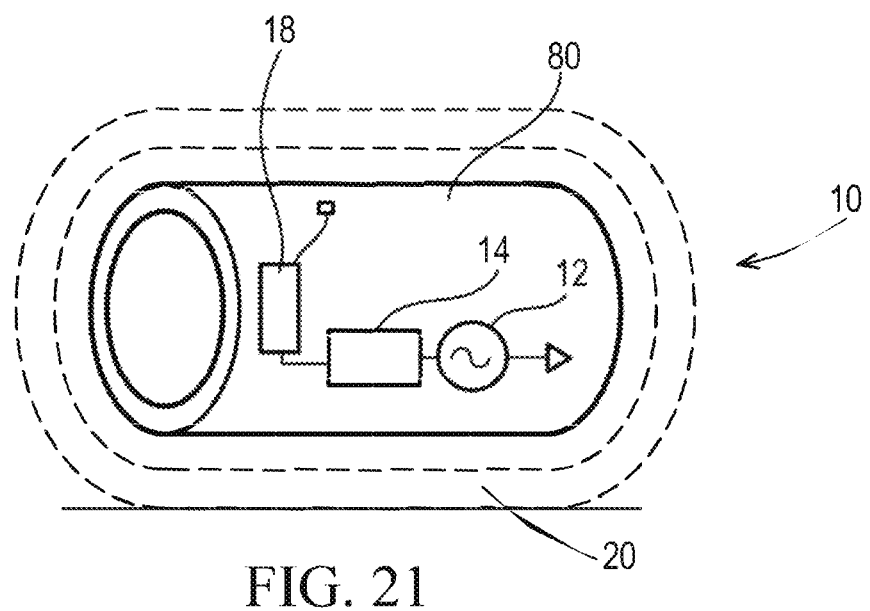
FIG. 21 is a schematic view of another embodiment of a sensing system of the present disclosure including a hollow cylindrical conductive element and a power source, nullification circuit and electrical medium positioned within the hollow conductive element, the electrical medium in electrical contact with the conductive element such that the electric field produced by the electrical medium is propagated through the conductive element.

FIG. 21 is a schematic view of another embodiment of a sensing system 10 of the present disclosure including a hollow cylindrical conductive element 80 wherein a power source 12, nullification circuit 14 and electrical medium 18 are positioned within the hollow conductive element 80, the electrical medium 18 in electrical contact with the conductive element 80 such that the electric field 20 produced by the electrical medium 18 is propagated through the conductive element 80. Such an embodiment can allow the power source 12, nullification circuitry 14, and the electrical medium 18 to be protected within the hollow cylindrical conductive element 80.

Figure 22:
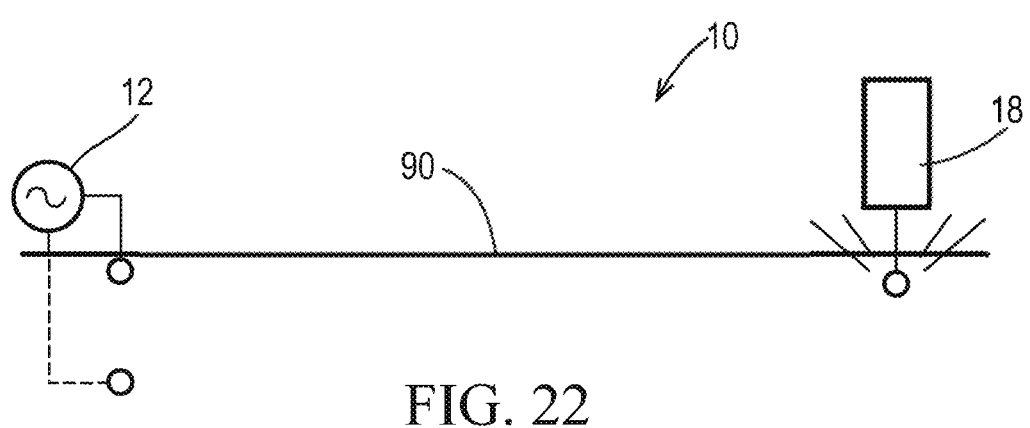
FIG. 22 is a schematic diagram of another embodiment of a sensing system 10 of the present disclosure wherein leads from a power source are connected to a conductive terrestrial body, such as the ground, and power is transferred from the power source to the electrical medium wireless through the terrestrial body.

FIG. 22 is a schematic diagram of another embodiment of a sensing system 10 of the present disclosure wherein leads from a power source 12 are connected to a conductive terrestrial body 90, such as the ground, and power is transferred from the power source 12 to the electrical medium 18 wireless through the terrestrial body 90. The nullification circuit can be electrically connected to either the power source 12 or the electrical medium 18 in such embodiments.

Figure 23:
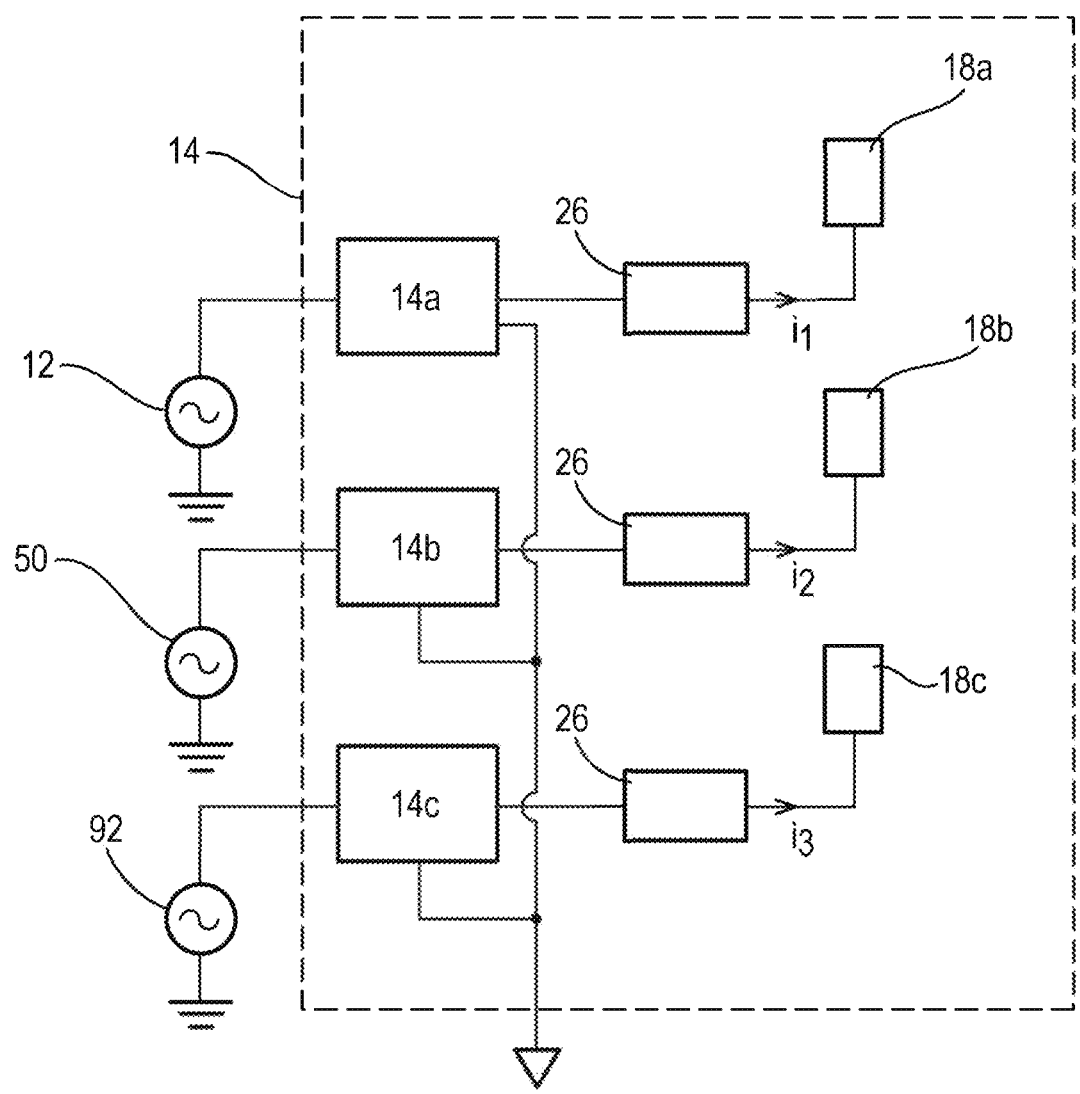
FIG. 23 is a schematic circuit diagram of another embodiment of a sensing system of the present disclosure including three electrical mediums and three power sources driving respective electrical mediums, each power source being isolated from one another within a nullification circuit, and respective voltage balancers associated with corresponding portions of the sensing system providing power to respective electrical mediums.

FIG. 23 is a schematic circuit diagram of another embodiment of a sensing system 10 of the present disclosure including three electrical mediums 18a, 18b, and 18c and three power sources 12, 50, and 92 driving respective electrical mediums 18a, 18b, and 18c, each power source being isolated from one another within a nullification circuit 14, and respective voltage balancers 26 can be associated with corresponding portions 14a, 14b, and 14c of the nullification circuit though which power is provided to respective electrical mediums 18a, 18b, and 18c. The voltage balancers 26 can allow the voltages being supplied to the various electrical mediums 18 to be equal such that output voltages from the nullification circuit 14, similar to those shown schematically in FIG. 15, can be substantially zero when no object is near the electrical mediums 18a, 18b, and 18c. Alternatively, each of the electrical mediums 18a, 18b, and 18c can be driven by a single power source 12. The circuitry shown in FIG. 23 can be readily expanded to accommodate additional electrical mediums and provide additional detection points for the presence or motion of an object of interest. Each of the portions of the nullification circuit 14 providing power to respective electrical wedges 18a, 18b, and 18c can be connected to common grounds. The schematic of FIG. 23 shows voltage balancers 26 on each portion of the nullification circuit 14 to provide for greater flexibility in balancing the nullification circuit 14 as desired. In other embodiments, a first portion of the nullification circuit 14 can be missing a voltage balancer, and the voltage balancers 26 on the remaining portions of the nullification circuit 14 can be used to make the voltages supplied to the electrical mediums 18 on the remaining portions of the nullification circuit 14 match the voltage supplied to the electrical medium 18 on the first portion of the nullification circuit 14.

In some embodiments, the unique features of these systems and method may include extremely low power consumption, lower operating voltages for greater safety to living beings and surroundings, or the ability to use standing waves as a source of digital logic as opposed to electrical switches.

The systems and methods disclosed herein have application to position, velocity, and speed measurement, object recognition for robotic systems, analysis of dielectric material characteristics, or lighting and occupancy sensing.

Thus, although there have been described particular embodiments of the present invention of a new and useful OMNIDIRECTIONAL, ELECTRIC NEAR-FIELD DISTANCE SENSING DEVICE, it is not intended that such references be construed as limitations upon the scope of this invention.

What is claimed is:

1. A sensor system for sensing the position of an object, the system comprising:
　a power source;
　a nullification circuit electrically connected to the power source, the nullification circuit including
　　an output voltage, and
　　a voltage balancer; and
　an electrical medium integrated into the nullification circuit, the electrical medium producing a standing wave electric field about the electrical medium when power is supplied from the power source to the electrical medium, wherein the nullification circuit is configured such that
the output voltage of the nullification circuit is substantially zero when power is supplied to the electrical medium and the object is not within a predetermined minimum distance from the electrical medium, and
the output voltage of the nullification circuit is substantially non-zero when the object is within the predetermined minimum distance from the electrical medium, and wherein
the output voltage of the nullification circuit being substantially zero comprises the output voltage including a differential voltage of greater than 0.1 volts, and
the output voltage of the nullification circuit being substantially non-zero comprises the output voltage including a differential voltage of less than or equal to 0.1 volts.

2. The system of claim 1, wherein the power source comprises an alternating power source.

3. The system of claim 1, wherein the voltage balancer comprises at least one of:
an adjustable resistor;
a capacitor;
an inductor;
a diode.

4. The system of claim 1, wherein the electrical medium comprises a wire coil.

5. The system of claim 1, wherein the output voltage of the nullification circuit includes a differential voltage between opposites sides of the nullification circuit.

6. The system of claim 1, wherein:
the electrical medium includes a natural resonant frequency; and
the output voltage of the nullification circuit can be observed by tuning in the electrical medium to the natural resonant frequency.

7. The system of claim 1, further comprising a processor electrically connected to the output voltage of the nullification circuit, the processor operable to measure the output voltage from the nullification circuit and determine a distance between the object and the electrical medium based on the measured output voltage of the nullification circuit.

8. The system of claim 7, further comprising an operational amplifier electrically connected between the output voltage of the nullification circuit and the processor, the processor electrically connected to the output voltage via the operational amplifier, the operational amplifier operable to amplify the output voltage being measured by the processor.

9. The system of claim 1, further comprising:
a second power source;
a second nullification circuit electrically connected to the second power source, the second nullification circuit including a second output voltage; and
a second electrical medium integrated into the second nullification circuit, the second electrical medium producing a second standard wave electric field about the second electrical medium when power is supplied from the second power source to the second electrical medium;
wherein the second nullification circuit is configured such that the second output voltage of the second nullification circuit is substantially zero when power is supplied to the second electrical medium and the object is not within a second predetermined minimum distance from the second electrical medium, the second output voltage of the second nullification circuit having a non-zero value when the object is within the second predetermined minimum distance from the second electrical medium,
wherein the second output voltage of the second nullification circuit being substantially zero comprises the second output voltage including a differential voltage of greater than 0.1 volts, and
wherein the second output voltage of the second nullification circuit being substantially non-zero comprises the second output voltage including a differential voltage of less than or equal to 0.1 volts.

10. The system of claim 9, further comprising:
a processor electrically connected to the output voltage of the nullification circuit and the second output voltage of the second nullification circuit;
wherein the processor is operable to:
measure the output voltage from the nullification circuit and determine a first distance between the object and the electrical medium based on the measured output voltage of the nullification circuit;
measure the second output voltage from the second nullification circuit and determine a second distance between the object and the second electrical medium based on the measured second output voltage of the second nullification circuit.

11. The system of claim 1, further comprising:
the electrical medium comprising a first electrical medium and a second electrical medium, each of the first and second electrical mediums being integrated into the nullification circuit;
a second power source, the power source providing power to the first electrical medium and the second power source providing power to the second electrical medium, the power source and the second power source being isolated from one another within the nullification circuit, the second electrical medium producing a second standard wave electric field about the second electrical medium when power is supplied from the second power source to the second electrical medium;
wherein the output voltage of the nullification circuit represents a voltage differential between the power supplied to the first electrical medium from the power source and the power supplied to the second electrical medium from the second power source.

12. A sensor system for sensing the position of a vehicle relative to an object, the system comprising:
a power source;
a nullification circuit electrically connected to the power source, the nullification circuit including
an output voltage, and
a voltage balancer; and
an electrical medium integrated into the nullification circuit, the electrical medium producing a standing wave electric field about the electrical medium when power is supplied from the power source to the electrical medium,
wherein
the sensing system is mountable to the vehicle, and
the nullification circuit is configured such that
the output voltage of the nullification circuit is substantially zero when the sensing system is mounted to the vehicle, power is supplied to the electrical medium, and the object is not within a predetermined minimum distance from the electrical medium, the output voltage of the nullification circuit is substantially non-zero when the object is within the predetermined minimum distance from the electrical medium, wherein the output voltage of the nullification circuit being substantially zero comprises the output voltage including a differential voltage of greater than 0.1 volts, and wherein the output voltage of the nullification circuit being substantially non-zero comprises the output voltage including a differential voltage of less than or equal to 0.1 volts.

13. The system of claim 12, wherein the power source is the power source for the vehicle.

14. The system of claim 12, wherein the voltage balancer comprises at least one of:
an adjustable resistor;
a capacitor;
an inductor;
a diode.

15. A method of sensing the position of an object, the method comprising the steps of:
providing:
a power source,
a nullification circuit electrically connected to the power source, the nullification circuit including
an output voltage, and
a voltage balancer, and
an electrical medium integrated into the nullification circuit, the electrical medium producing a standing wave electric field about the electrical medium when power is supplied from the power source to the electrical medium;
balancing, via the voltage balancer, the nullification circuit such that the output voltage is substantially zero when power is supplied to the electrical medium and the object is not within a predetermined minimum distance from the electrical medium; and
detecting a substantially non-zero value of the output voltage when the object is within the predetermined minimum distance from the electrical medium, wherein
the output voltage of the nullification circuit being substantially zero comprises the output voltage including a differential voltage of greater than 0.1 volts, and
the output voltage of the nullification circuit having the substantially non-zero value comprises the output voltage including a differential voltage of less than or equal to 0.1 volts.

16. The method of claim 15:
wherein the electrical medium includes a natural resonant frequency; and
further comprising determining the natural resonant frequency according to the equation $$\omega_0^2 = \frac{1}{LC} \frac{[\cosh(X) - \sinh(X)]}{[\cosh(X) + \sinh(X)]} = \frac{1}{LCe^{2X}}$$

wherein
$\omega_0$ includes the standing wave resonant frequency,
L includes a sum of inductance of surroundings and the electrical medium,
C includes a sum of a capacitance of the surroundings and the electrical medium, and
X includes a position along the electrical medium.

17. The method of claim 15, further comprising the step of determining a distance between the object and the electrical medium based on the detected non-zero value of the output voltage of the nullification circuit.

18. The method of claim 15, further comprising:
measuring the output voltage from the nullification circuit; and
determining a distance between the object and the electrical medium based on the measured output voltage of the nullification circuit.

19. The method of claim 15, wherein:
the step of providing further includes providing a processor; and
the method further includes amplifying the output voltage being measured by the processor.

* * * * *